United States Patent
Lee et al.

(10) Patent No.: US 11,996,539 B2
(45) Date of Patent: May 28, 2024

(54) SECONDARY BATTERY ELECTRODE, AND METHOD FOR PRODUCING SAME

(71) Applicant: SK INNOVATION CO., LTD., Seoul (KR)

(72) Inventors: Jonghyuk Lee, Daejeon (KR); Dockyoung Yoon, Daejeon (KR); Heegyoung Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 185 days.

(21) Appl. No.: 16/980,615

(22) PCT Filed: Mar. 15, 2019

(86) PCT No.: PCT/KR2019/003006
§ 371 (c)(1),
(2) Date: Sep. 14, 2020

(87) PCT Pub. No.: WO2019/177409
PCT Pub. Date: Sep. 19, 2019

(65) Prior Publication Data
US 2021/0020898 A1    Jan. 21, 2021

(30) Foreign Application Priority Data

Mar. 15, 2018  (KR) .................. 10-2018-0030070
Mar. 14, 2019  (KR) .................. 10-2019-0029127

(51) Int. Cl.
*H01M 4/04*     (2006.01)
*H01M 4/131*    (2010.01)
(Continued)

(52) U.S. Cl.
CPC ....... *H01M 4/0433* (2013.01); *H01M 4/0471* (2013.01); *H01M 4/131* (2013.01);
(Continued)

(58) Field of Classification Search
CPC ......... H01M 10/0525; H01M 10/0587; H01M 4/04; H01M 4/62; H01M 4/36; H01M 4/133

See application file for complete search history.

(56) References Cited

U.S. PATENT DOCUMENTS 6,007,588 A     12/1999  Mitchell
6,579,649 B2 *   6/2003  Tsutsue ................ H01M 4/602
                                                429/231.95
(Continued)

FOREIGN PATENT DOCUMENTS

JP    H07-201363 A    8/1995
JP    2000-353512 A   12/2000
(Continued)

OTHER PUBLICATIONS

Supplementary European Search Report for the European Patent Application No. 19768601.7 issued by the European Patent Office dated Dec. 2, 2021.

(Continued)

*Primary Examiner* — Kenneth J Douyette
(74) *Attorney, Agent, or Firm* — IP & T GROUP LLP

(57) ABSTRACT

A method for producing a secondary battery electrode, according to the present invention, comprises: a slicing step for producing an active material film by slicing an active material bulk; and a binding step for combining a current collector and the active material film. A method for producing a secondary battery electrode according to the present invention produces an active material film by slicing an active material bulk, which is a free-standing molded body or pellet, thus allowing binder-free active material film to be produced, and as no actual restrictions exist for the thickness of the active material film, thick active material film can be (Continued)

produced, and thus electrodes having high-loading and high composite density can be produced.

11 Claims, 6 Drawing Sheets

(51) Int. Cl.
*H01M 4/133* (2010.01)
*H01M 4/134* (2010.01)
*H01M 4/1391* (2010.01)
*H01M 4/1393* (2010.01)
*H01M 4/1395* (2010.01)
*H01M 4/36* (2006.01)
*H01M 4/62* (2006.01)
*H01M 4/66* (2006.01)
*H01M 10/0525* (2010.01)
*H01M 4/02* (2006.01)

(52) U.S. Cl.
CPC ........... *H01M 4/133* (2013.01); *H01M 4/134* (2013.01); *H01M 4/1391* (2013.01); *H01M 4/1393* (2013.01); *H01M 4/1395* (2013.01); *H01M 4/364* (2013.01); *H01M 4/366* (2013.01); *H01M 4/623* (2013.01); *H01M 4/667* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2002/0006548 A1 | 1/2002 | Tsutsue | |
| 2002/0136948 A1* | 9/2002 | Missling | H01M 4/0483 252/182.1 |
| 2003/0031923 A1 | 2/2003 | Aoshima et al. | |
| 2005/0271798 A1 | 12/2005 | Zhong et al. | |
| 2009/0197183 A1 | 8/2009 | Kato | |
| 2013/0302669 A1* | 11/2013 | Braun | C01B 33/18 428/221 |
| 2014/0038055 A1* | 2/2014 | Hozumi | H01M 4/0402 429/223 |
| 2015/0010821 A1* | 1/2015 | Makimura | H01M 4/502 429/223 |
| 2015/0333376 A1 | 11/2015 | Gaben | |
| 2016/0248084 A1* | 8/2016 | Cairns | C01B 17/40 |

FOREIGN PATENT DOCUMENTS

| | | |
|---|---|---|
| JP | 2004-521453 A | 7/2004 |
| JP | 2009-181877 A | 8/2009 |
| JP | 2010-123423 A | 6/2010 |
| JP | 2013-93188 A | 5/2013 |
| JP | 5534000 B2 | 6/2014 |
| JP | 2017-036185 A | 2/2017 |
| KR | 10-0184316 B1 | 5/1999 |
| KR | 10-2005-0027224 A | 3/2005 |
| KR | 10-0578868 B1 | 5/2006 |
| KR | 10-2008-0098261 A | 11/2008 |
| KR | 10-1211072 B1 | 12/2012 |
| KR | 10-2013-0043932 A | 5/2013 |
| KR | 101572082 B1 | 11/2015 |
| KR | 101608635 B1 | 4/2016 |
| KR | 10-1631776 B1 | 6/2016 |

OTHER PUBLICATIONS

Extended European Search Report for the European Patent Application No. 19768601.7 issued by the European Patent Office dated May 6, 2022.
Office Action for the Japanese Patent Application No. 2020-545111 issued by the Japanese Patent Office dated Feb. 7, 2023.
Office Action for the Chinese Patent Application No. 201980014936.0 issued by the Chinese Patent Office dated Jun. 26, 2023.
Notice of Reasons for Rejection or the Japanese Patent Application No. 2020-545111 issued by the Japanese Patent Office dated Aug. 1, 2023.
Office Action on the Chinese Patent Application No. 201980014936.0 issued by the Chinese Patent Office on Jan. 31, 2024.

* cited by examiner

[FIG. 1]
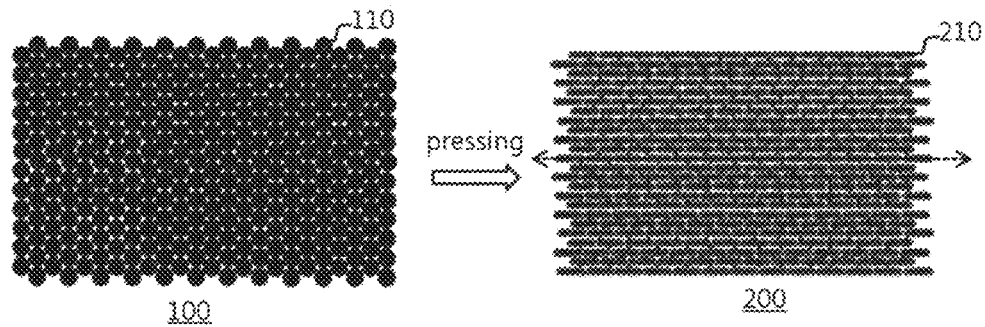
[FIG. 2]
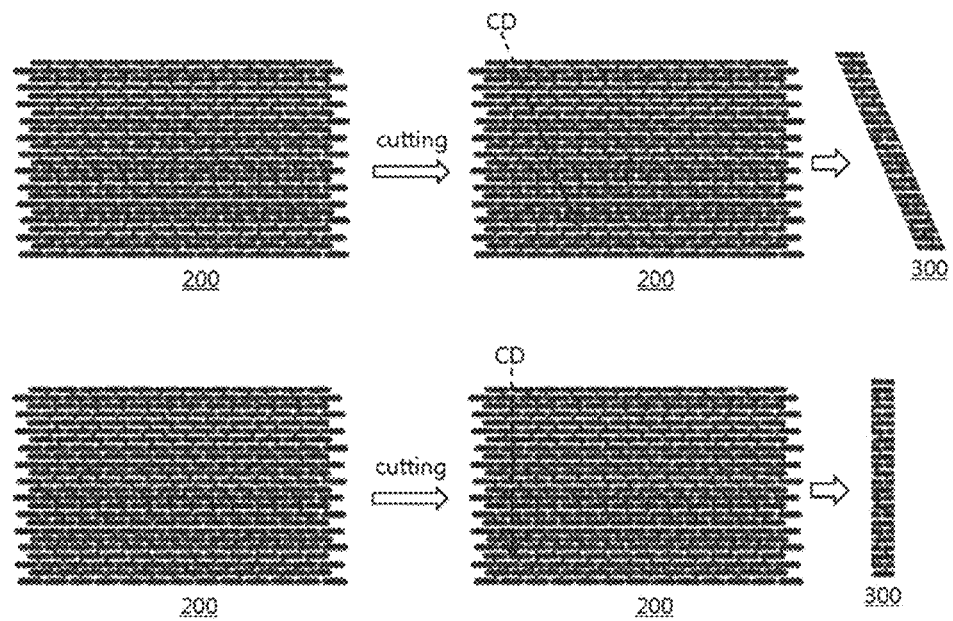

[FIG. 3]
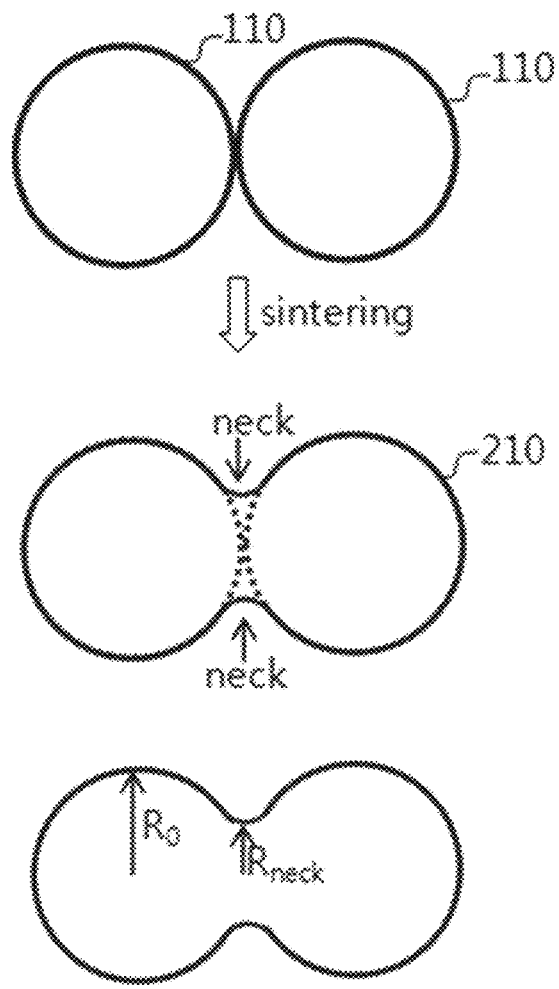
[FIG. 4]
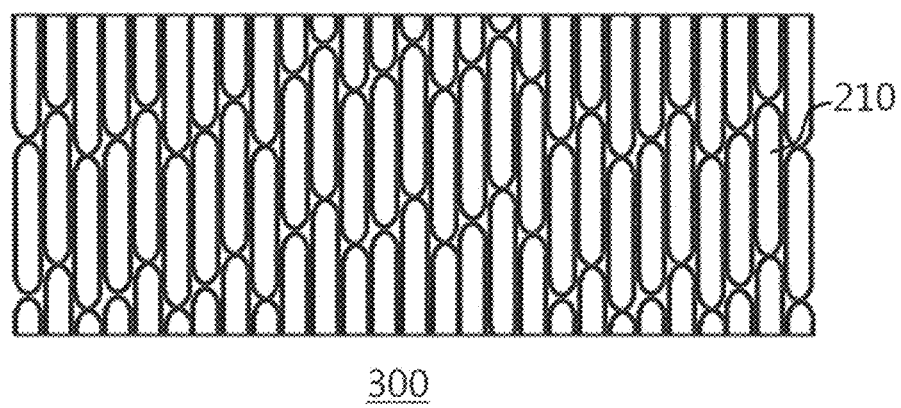

[FIG. 5]
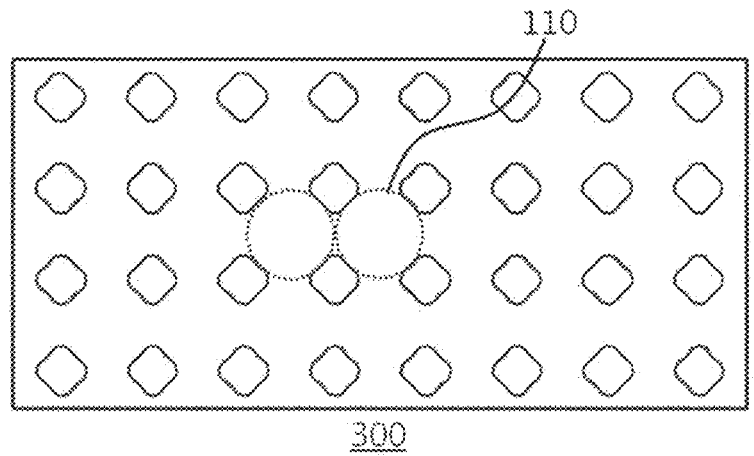
[FIG. 6]
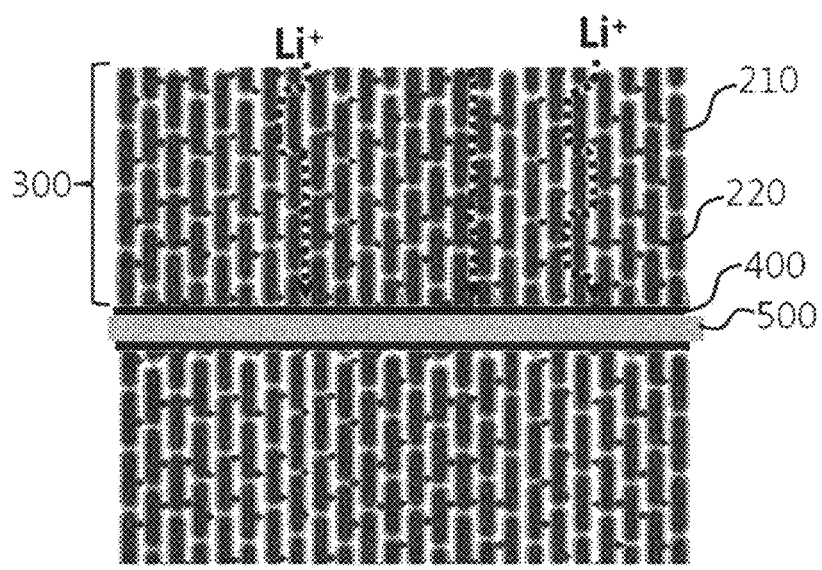

[FIG. 7]
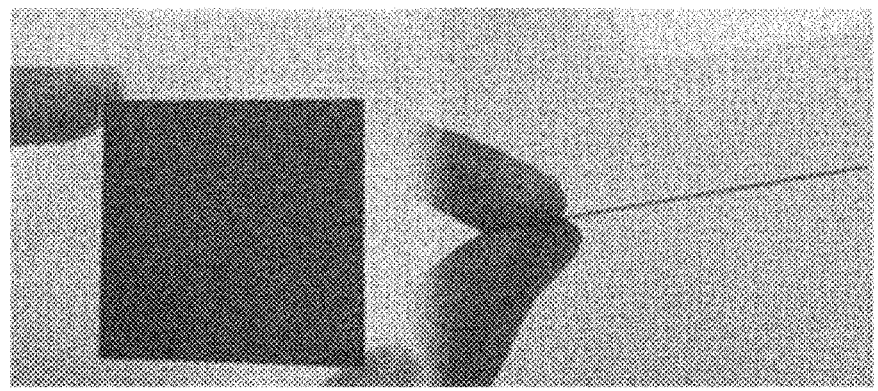

[FIG. 8A]
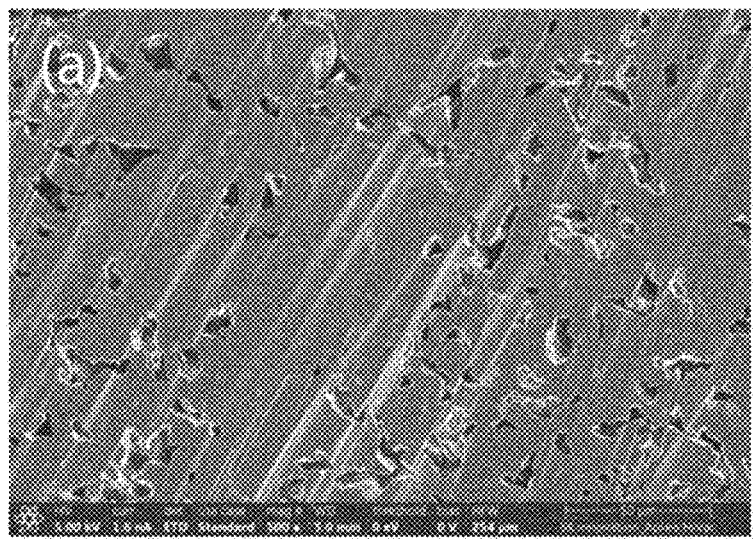
[FIG. 8B]
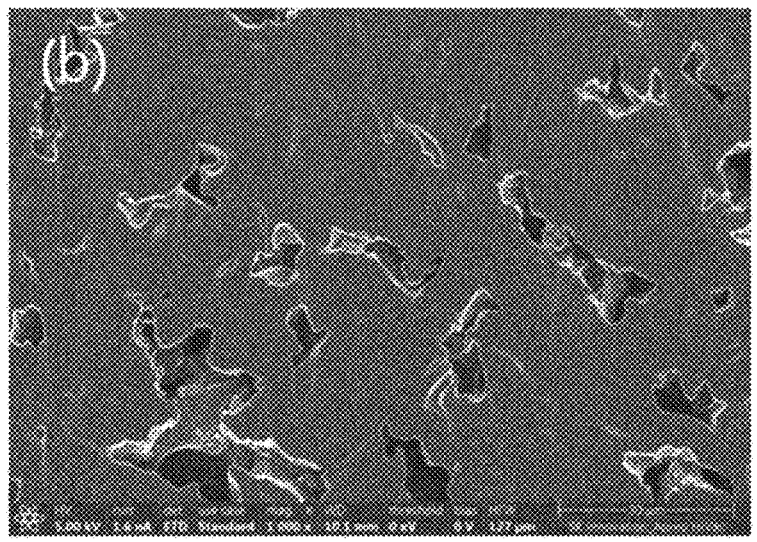

[FIG. 9]
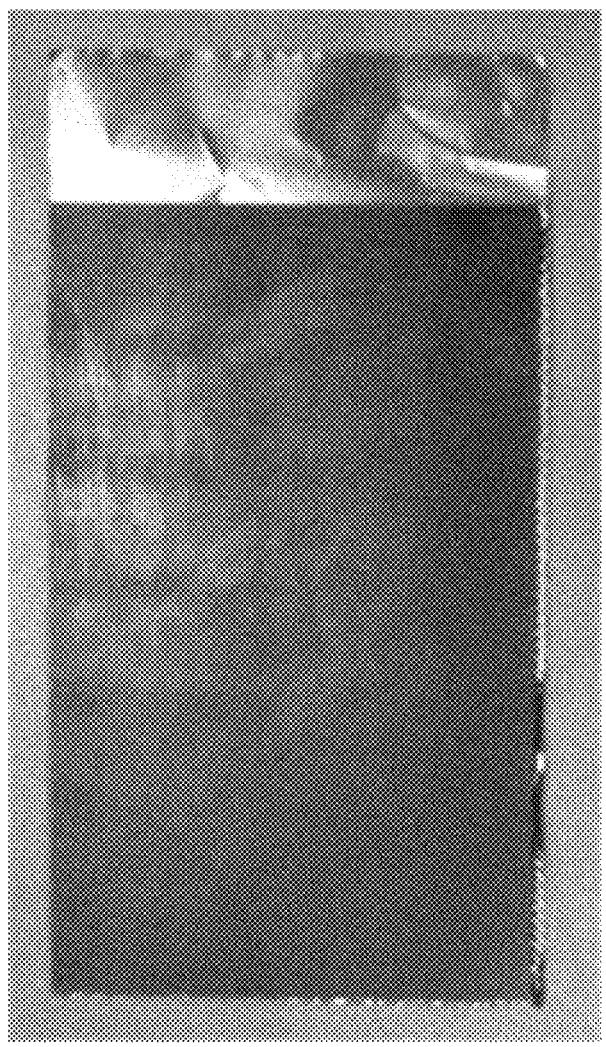

SECONDARY BATTERY ELECTRODE, AND METHOD FOR PRODUCING SAME

TECHNICAL FIELD

The present invention relates to an electrode for a secondary battery and a method of producing the same.

BACKGROUND ART

Interest in electric automobiles and hybrid electric automobiles which may replace vehicles using fossil fuel, such as gasoline cars and diesel cars, is growing fast, due to tightened environmental regulation, high oil prices, exhaustion of fossil energy, and the like.

As a power source of electric automobiles, a nickel hydrogen metal secondary battery is currently mainly used, but a study of using a lithium secondary battery which has a higher power density (at least three times higher) than a nickel hydrogen metal secondary battery, a long cycle life, and a low self discharge rate, as a main power source of an electric automobile, is actively under way.

In order to use a lithium secondary battery as a power source of an electric automobile, most of all, a high capacity should be implemented, and in order to implement a high capacity, a technique of a novel negative electrode active material or positive electrode active material having a high capacity (Korean Patent Registration Nos. 1572082 and 1608635) is mainly developed.

However, even in the case in which a novel material having a high capacity is developed, a conventional technique of producing an electrode by applying a slurry containing an active material, a binder, and a conductive material to a current collector, and performing drying and rolling has limitation on implementation of an electrode having a high mixture and high density, due to the problems that when the electrode is manufactured with a high mixture density, voids are blocked so that electrolyte solution impregnation becomes difficult to decrease mobility of lithium ions, and an active material is pressed in a direction parallel to a current collector by rolling, so that a travel distance of lithium ions becomes longer and path complexity (tortuosity) is increased.

DISCLOSURE

Technical Problem

An object of the present invention is to provide a method of producing a novel electrode for a secondary battery allowing implementation of high loading and a high mixture density.

Another object of the present invention is to provide a method of producing a novel electrode for a secondary battery allowing implementation of a binder-free electrode in which an active material layer contains no binder.

Another object of the present invention is to provide a method of producing a novel electrode for a secondary battery which may reduce costs by a more simplified process and allow mass production of electrodes having uniform quality.

Still another object of the present invention is to provide an active material film on which an electrode having high loading and high mixture density may be implemented, an electrode for a secondary battery including the same, and a secondary battery including the same.

Technical Solution

In one general aspect, a method of producing an electrode for a secondary battery includes: a cutting step of slicing an active material bulk to produce an active material film; and a binding step of integrating a current collector and the active material film.

The method of producing an electrode for a secondary battery according to an exemplary embodiment of the present invention may further include a bulk production step of using a raw material including a particulate electrode active material to produce an active material bulk, before the slicing.

In the method of producing an electrode for a secondary battery according, to an exemplary embodiment of the present invention, the electrode active material may be a negative electrode active material or a positive electrode active material.

In the method of producing an electrode for a secondary battery according to an exemplary embodiment of invention, the active material bulk may be capable of free-standing.

In the method of producing an electrode for a secondary battery according to an exemplary embodiment of the present invention, the active material bulk may be a molded body or a sintered body.

In the method of producing an electrode for a secondary battery according to an exemplary embodiment of the present invention, the bulk production step may include a molding step of compression-molding the raw material to produce a molded body; or may include the molding step and a sintering step of heat-treating the molded body produced in the melding step to produce a sintered body.

In the method of producing an electrode for a secondary battery according to an exemplary embodiment of the present invention, the raw material may further include one or more additives selected from the group comprising a binder, a conductive material, a carbon precursor, and a pore forming agent.

In the method of producing an electrode for a secondary battery according to an exemplary embodiment of the present invention, the conductive material may include particles, fibers, nanostructures, or mixtures thereof of one or two or more materials selected from the group comprising conductive carbon, conductive polymers, and metals.

In the method of producing an electrode for a secondary battery according to an exemplary embodiment of the present invention, the conductive nanostructure may be one or two or more selected from the group comprising nanowires, nanotubes, nanoplates, nanoribbons, nanoparticles, and nanorods.

In the method of producing an electrode for a secondary battery according to an exemplary embodiment of the present invention, the carbon precursor may be one or more selected from the group comprising cokes, pitch, and thermocurable resins and thermoplastic resins.

In the method of producing an electrode for a secondary battery according to an exemplary embodiment of the present invention, the particulate particles may have a core-shell structure of a core of the electrode active material and a shell of a heteromaterial.

In the method of producing an electrode for a secondary battery according to an exemplary embodiment of the present invention, the heteromaterial may include a second electrode active material, a second electrode active material precursor, a conductive material, a binder, a carbon precursor, or a mixture thereof.

In the method of producing an electrode for a secondary battery according to an exemplary embodiment of the present invention, the raw material may include two different kinds of electrode active materials having different compositions, crystal structures, particle shapes, mechanical properties, or physical properties.

In the method of producing an electrode for a secondary battery according to an exemplary embodiment of the present invention, the porosity of the active material film may be controlled by the porosity of the active material bulk.

In the method of producing an electrode for a secondary battery according to an exemplary embodiment of the present invention, the electrode active material in the active material bulk may have an orientation, and the oriented direction of the electrode active material in the active material film based on the thickness direction of the active material film may be controlled by a cutting direction in the cutting step.

In the method of producing an electrode for a secondary battery according to an exemplary embodiment of the present invention, the binding step may include forming an adhesive layer on at least one surface of a surface of the current collector and a surface of the active material film; and layering a current collector and an active material film so as to be in contact with each other, with the adhesive layer interposed therebetween.

In the method of producing an electrode for a secondary battery according to an exemplary embodiment of the present invention, the binding step may include forming a metal film on one surface of the active material film.

In the method of producing an electrode for a secondary method according to an exemplary embodiment of the present invention, the adhesive layer may be conductive.

In the method of producing an electrode for secondary battery according to an exemplary embodiment of the present invention, the negative electrode active material may include an oxide of one or two elements selected from the group comprising easily graphitizable carbon; poorly graphitizable carbon; natural graphite; artificial graphite; carbon nanotubes; graphene; silicon; Sn alloys; Si alloys; and Sn, Si, Ti, Ni, Fe, and Li; or a mixture thereof.

In the method of producing an electrode for a secondary battery according to an exemplary embodiment of the present invention, the positive electrode active material may include a lithium-metal oxide having a layered structure; a lithium-metal oxide having a spinel structure; a lithium-metal phosphate having an olivine structure; or a mixture thereof.

In the method of producing an electrode for a secondary battery according to an exemplary embodiment of the present invention, the active material may include natural graphite, artificial graphite, or a mixture thereof.

In the method of producing an electrode for a secondary battery according to an exemplary embodiment of the present invention, the active material may include a plate shape or a flake shape.

In the method of producing an electrode for a secondary battery according to an exemplary embodiment of the present invention, the bulk production step may include press-molding the raw material including composite particles having a core-shell structure of electrode active material core-carbon precursor shell as the particulate electrode active material to produce a molded body; and heat-treating the molded body to pyrolyze the carbon precursor of the shell into carbon.

In the method of producing an electrode for a secondary battery according, to an exemplary embodiment of the present invention, the bulk production step may include press-molding a raw material including a particulate electrode active material and a carbon precursor to produce a molded body; and heat-treating the molded body to pyrolyze the carbon precursor into carbon.

In the method of producing an electrode for a secondary battery according to an exemplary embodiment of the present invention, the molded body may be produced by unidirectional, bidirectional, or isotropic compression molding.

In the method of producing an electrode for a secondary battery according to an exemplary embodiment of the present invention, a step of surface-treating at least one surface of the active material film may be further performed, after the cutting step and before the binding step, or after the binding step.

In the method of producing an electrode for a secondary battery according to an exemplary embodiment of the present invention, the surface treatment may include surface roughness adjustment.

In another general aspect, an electrode for a secondary battery produced by the production method described above is provided.

In another general aspect, a lithium secondary battery includes: a positive electrode; a negative electrode; a separator interposed between the positive electrode and the negative electrode; and an electrolyte solution, wherein one or more electrodes selected from the positive electrode and the negative electrode may include an active material film containing an electrode active material, a current collector, and an adhesive for adhering the active material film to the current collector.

In another general aspect, a lithium secondary battery (II) includes: a positive electrode; a negative electrode; a separator interposed between the positive electrode and the negative electrode; and an electrolyte solution, wherein an active material film included in one or more electrodes selected from the positive electrode and the negative electrode may be a binder-free film which contains no organic binder.

In the lithium secondary battery (I and II) according to an exemplary embodiment of the present invention, the active material film may be a free-standing film.

In the lithium secondary battery (I and II) according to an exemplary embodiment of the present invention, an active material disposed on a surface of the active material film may be cut particulates.

In the lithium secondary battery (I and II) according to an exemplary embodiment of the present invention, the active material film may be a cut film which has been cut from a molded body or a sintered body containing an electrode active material.

In the lithium secondary battery (I and II) according to an exemplary embodiment of the present invention, the electrode active material in the active material film may have an orientation based on a thickness direction of the active material film.

In the lithium secondary battery (I and II) according to an exemplary embodiment of the present invention, the active material film may have an interparticle neck of an electrode active material formed therein.

In the lithium secondary battery (I) according to an exemplary embodiment of the present invention, the active material film may contain no organic binder.

In the lithium secondary battery (I and II) according to an exemplary embodiment of the present invention, for a ratio being obtained by dividing an absolute value of a difference between porosity in a surface region and porosity in a central region by porosity in a central region, based on a cross section in a thickness direction, the active material film may have a ratio of 10% or less.

In the lithium secondary battery (I and II) according to an exemplary embodiment of the present invention, the active material film may further include one or more selected from the group comprising pyrocarbon and conductive materials.

In the lithium secondary battery (I and II) according to an exemplary embodiment of the present invention, the active material film may have an apparent porosity of 10 to 45%.

In the lithium secondary battery (I and II) according to an exemplary embodiment of the present invention, the active material film may include electrode active material particles and pyrocarbon which binds the electrode active material particles.

In the lithium secondary battery (I) according to an exemplary embodiment of the present invention, the adhesive may include a resin having, curability.

In the lithium secondary battery (I) according to an exemplary embodiment of the present invention, the adhesive may include one or more conductive components selected from the group comprising conductive resin, conductive particles, and conductive nanostructures.

In the lithium secondary battery (I and II) according to an exemplary embodiment of the present invention, the electrode active material may be a negative electrode active material and a positive electrode active material.

In another general aspect, lithium secondary battery module includes lithium secondary battery described above.

In another general aspect, a device to which electric power is supplied by the lithium secondary battery described above, is provided.

In another general aspect, an electrolyte solution-based active material film for a secondary battery is provided.

The active material film according to an exemplary embodiment of the present invention is an active material film for a secondary battery including an electrolyte solution, and may be active material film for a secondary battery which contains an electrode active material and is capable of free-standing.

The active material film according to another exemplary embodiment of the present invention is an active material film for a secondary battery including an electrolyte solution, and may be a binder-free active material film which contains an electrode active material and contains no organic binder.

The active material film according to an exemplary embodiment of the present invention may have an interparticle neck of an electrode active material formed therein.

In the active material film according to an exemplary embodiment of the present invention, the electrode active material in the active material film may have an orientation based on a thickness direction of the active material film.

The active material film according to an exemplary embodiment of the present invention may further include one or more selected from the group comprising conductive materials and pyrocarbon.

For a ratio being obtained by dividing an absolute value of a difference between porosity in a surface region and porosity in a central region by porosity in a central region, based on a cross section in a thickness direction, the active material film according to an exemplary embodiment of the present invention may have a ratio of 10% or less.

The active material film according to an exemplary embodiment of the present invention may further include one or more selected from the group comprising pyrocarbon and conductive materials.

The active material film according to an exemplary embodiment of the present invention may have an apparent porosity of 10 to 45%.

In another general aspect, an electrode for a secondary battery based on an electrolyte solution is included.

The electrode for a secondary battery according to the present invention is an electrode for a secondary battery based on an electrolyte solution, and includes a binder-free active material film which contains an electrode active material and contains no organic binder.

The electrode for a secondary battery according to the present invention is an electrode for a secondary battery based on an electrolyte solution, and may be an electrode which contains an electrode active material, in which the active material film is bound to at least one surface of a current collector by an adhesive.

In an electrode for a secondary battery according to an exemplary embodiment, the active material film may be a free-standing film.

In an electrode for a secondary battery according to an exemplary embodiment, the active material film may further include one or more selected from the group comprising conductive materials and pyrocarbon.

In an electrode for a secondary battery according to an exemplary embodiment, the active material film may have an interparticle neck of active material particles formed therein.

In still another general aspect, a secondary battery includes the electrode described above.

Advantageous Effects

In the method of producing a secondary battery a cording to an exemplary embodiment of the present invention, since the electrode for a secondary battery is produced by an extremely simple process of slicing-adhering an active material bulk, process building is easy and inexpensive, precise process control with a high degree is so unnecessary, and commerciality is excellent.

In a conventional production process of an electrode for a secondary battery, it was possible to produce an electrode which satisfies a desired degree (of smoothness, weight part, density uniformity, and the like) only when a series of processes such as final rolling and vacuum drying after performing production/inspection of a slurry and continuous coating on a thin conductive substrate and drying, are tightly managed and controlled.

However, in the method of producing an electrode for a secondary battery according to an exemplary embodiment of the present invention, since the method is based on a slicing-adhesion process of an active material bulk, the method is fundamentally free from problems arising from a process of coating a slurry on a thin conductive substrate as in the conventional process, for example, problems that a conductive substrate wobbles by dry air volume adjustment, a thickness variation between an edge portion and a central portion depending on drying conditions occurs when drying after coating under high loading conditions, and thus, an electrode material in the edge portion is desorbed in a subsequent rolling process, by applying a process of adhesion after slicing instead of a coating process.

In addition, in the production process of the active material bulk, uniform dispersion and mixing are possible by kneading with a relatively small amount of a solvent, a dilution process for lowering a viscosity for coating is unnecessary, efforts to secure long-term phase stability of the slurry by viscosity adjustment are unnecessary, and the process may be simplified.

In addition, in the method of producing an electrode for a secondary battery according to an exemplary embodiment of the present invention, since a large amount of active material films are produced based on a bulk, an electrode having extremely uniform quality may be mass-produced by a simple process of slicing-adhesion, and an electrode having extremely uniform quality may be mass-produced.

In addition, in the method of producing an electrode for a secondary battery according to an exemplary embodiment of the present invention, since an active material bulk which is a molded body or sintered body capable of free-standing is sliced to produce an active mater tall film, a binder-free active material film may be produced, since there is no substantial restriction on the thickness of the active material film, an active material film in the form of a thick film may be produced, and an electrode having high loading and high mixture density may be produced.

Specifically, the method of producing an electrode for a secondary battery according to an exemplary embodiment of the present may produce an active material bulk composed of an active material itself, a conductive material and an active material, an active material and pyrocarbon, or an active material, a conductive material, and pyrocarbon. Also or independently, since pores opening controlled in a thickness direction are formed uniformly, even in the case in which the thickness of the active material film is increased, the electrolyte solution may stably permeate, and thus, there is substantial limitation on the film thickness. Also or independently, since the particulate electrode active material in the active material bulk is highly filled or the particles are sintered with each other by pressure or pressure and heat in a molding process, an electrode having high loading and high mixture density may be produced.

In the method of producing an electrode for a secondary battery according to an exemplary embodiment of the present invention, an oriented direction of electrode active material particles in the active material film may be controlled in a cutting direction of the active material bulk, and thus, an electrolyte solution impregnation speed, output characteristics, and rate characteristics may be improved.

In the method or producing an electrode for a secondary battery according to an exemplary embodiment of the present invention, the active material film maintains an open pore network that is uniform (designed) substantially independently of thickness, thereby achieving uniform and stable impregnation of an electrolyte solution.

Since the active material film being an independent member may be a binder-free film containing no organic binder, the secondary battery according to an exemplary embodiment of the present invention allows high loading and a high mixture density formation, and thus, the electrode may easily implement high energy density battery design.

Though the secondary battery according an exemplary embodiment of the present invention is in the form of a thick film due to the orientation of the active material film being an independent member or a structure bound by an interparticle neck, an electrolyte solution (and lithium ions) may be impregnated therein uniformly and stably.

DESCRIPTION OF THE DRAWINGS

FIG. 1 a cross sectional view illustrating one cross section of an active material bulk as a molded body, according to an exemplary embodiment of the present invention.

FIG. 2 is a drawing illustrating a process of slicing an active material bulk to produce an active material film, according to an exemplary embodiment of the present invention.

FIG. 3 is a drawing illustrating a binding state based on active material particles of two electrodes adjacent to each other in an active material bulk as a sintered body, according to an exemplary embodiment of the present invention.

FIG. 4 is a cross sectional view illustrating a cross section of an active material film according to an exemplary embodiment of the present invention.

FIG. 5 is another cross sectional view illustrating a cross section of an active material film according to an exemplary embodiment of the present invention.

FIG. 6 is a cross sectional view illustrating a cross section of an electrode according to an exemplary embodiment of the present invention.

FIG. 7 is an optical photograph of an active material film produced according to an exemplary embodiment of the present invention.

FIGS. 8A and 8B are scanning electron microscope photographs of an active material film produced according to an exemplary embodiment of the present invention.

FIG. 9 is an optical photograph of an electrode produced according to an exemplary embodiment of the present invention.

BEST MODE

Hereinafter, an active material film, an electrode for a secondary battery, a secondary battery, and a method of producing the same according to the present invention will be described in detail with reference to the accompanying drawings. The drawings provided below are provided by way of example so that the spirit of the present invention can be sufficiently transferred to a person skilled in the art to which the present invention pertains. Therefore, the present invention is not limited to the drawings provided below but may be embodied in other forms, and the drawings suggested below may be exaggerated in order to clear the spirit of the present invention. Technical terms and scientific terms used herein have the general meaning understood by those skilled in the art to which the present invention pertains unless otherwise defined, and a description for the known function and configuration unnecessarily obscuring the gist of the present invention will be omitted in the following description and the accompanying drawings. Throughout the present specification, unless explicitly described to the contrary, "comprising" any elements will be understood to imply further inclusion of other elements rather than the exclusion of any other elements. In addition, unless explicitly described the contrary, a singular form includes a plural form herein.

In the above description of the method of producing an electrode, the active material film, the electrode, or the secondary battery according to the present invention, an active material bulk is a lone independent three-dimensional body containing an electrode active material, and may mean a three-dimensional body in the state of being capable of free-standing which may maintain a constant form itself and support the weight itself.

As an example, the bulk may mean that it has a size of at least one dimension (width, length, or breadth) more than the designed thickness, based on at least a designed thickness of the active material layer of the electrode to be desired. More specifically, the bulk may mean that the size of one dimension of the three-dimensional body along at least one axis is at least 5 times, and substantially 10 times or more the thickness of the active material region of the electrode to be produced, based on three axes orthogonal to each other. In addition, the bulk may mean that each dimension of the three-dimensional body according to each of other two axes has a size corresponding to or more than a width or length of the active material region of the electrode to be produced, but is not necessarily limited thereto.

As an example, in terms of not a size but a mass, the bulk may mean a three-dimensional body having at least a weight more than the designed weight, based on a designed weight of the active material layer of the electrode to be desired. More specifically the bulk may mean a three-dimensional body having a weight of 10 times or more, and substantially 50 times or more the designed weight (weight of one active material layer of the electrode to be desired), but is not necessarily limited thereto.

In the above description of the method of producing an electrode, the electrode, or the secondary battery according to the present invention, being capable of free-standing means that an active material bulk or an active material film may support the weight itself in the state in which the active material bulk or active material film maintains the shape. In addition, free-standing may mean that the active material bulk or the active material film may be transferred or positioned itself without a separate supporting member. Experimentally, a film capable of free-standing may mean a film in the state which when a film is placed on a hollow ⨆-shaped support having a flat bottom and flat pillars in both sides, with only 2 mm portions of both sides of the film hanging on the support (pillar), and a standard weight of 1 g is placed on a central portion of the film, a downward sagging degree of the specimen is within 1 mm, based on a film having a width of 1 cm, a length of 5 cm, and a thickness to accord with an active material region design thickness of a secondary battery to be desired.

The method of producing an electrode for a secondary battery according to the present invention includes: a cutting step of slicing an active material bulk to produce an active material film; and a binding step of integrating a current collector and the active material film.

In a specific example, the method of producing an electrode for a secondary battery may further include a bulk production step of using a raw material including a particulate electrode active material to produce an active material bulk, before the slicing. That is, the method of producing an electrode for a secondary battery according to an exemplary embodiment of the present invention may include a) using a raw material including a particulate electrode active material to produce an active material bulk (bulk production step); b) slicing the active material bulk to produce an active material film (cutting step); and c) integrating a current collector and the active material film (binding step).

In a specific example, the active material bulk may be a molded body or a sintered body. Thus, when the active material bulk is a molded body, step a) may include a molding step of compression-molding a raw material to produce a molded body. Otherwise, when the active material bulk is a sintered body, step a) may include a molding step of compression-molding a raw material to produce a molded body; and heat-treating the molded body produced in the molding step to produce a sintered body.

As described above, in the method of producing an electrode according to the present invention, a raw material including a particulate electrode active material is used to produce an active material bulk, the active material bulk is sliced to produce an active material film corresponding to an active material layer on a current collector in a conventional slurry-based process, and the active material film produced independently of the current collector is bound to the current collector, thereby producing an electrode, rather than using the conventional slurry-based process in which a slurry containing an active mater tall is applied on a current collector and rolled.

In the conventional electrode production method of applying, drying, and rolling a slurry, the characteristics of the slurry themselves such as viscosity or dispersibility of the slurry which is a fluidized bed, a specific application method, or physical (mechanical) properties of a material contained in the slurry, drying conditions of the applied film, and the like directly affects a structure of the active material layer.

That is, as a production technique of an electrode using an active material slurry largely depends on dynamic elements to determine the structure of the active material layer, it is practically very difficult to precisely control the structure of the active material layer, and it is difficult to secure structural uniformity in a large area. Furthermore, there is also a restriction on the thickness of the active material layer which may be produced by the application process. In addition, when the thickness of the electrode should be increased, a drying time in a drying process is increased, and thus, process parameters should be changed, for example, a length of the drying furnace is increased. Thus, there is also a problem of requiring building a new process facility.

However, in the method of producing an electrode according to the present invention, an active material bulk having predesigned material, pore structure, and porosity is sliced to produce an independent active material film, rather than based on a slurry, and then the produced active material film is bound to a current collector to produce the electrode, thereby controlling the structure of the active material film precisely and reproducibility. In addition, in the method of producing an electrode according to the present invention, a large amount of active material film may be produced by slicing the active material bulk, and since the active material film is produced based on a completely solid active material bulk rather than a liquid phase-based slurry, an active material film having uniform quality may be mass-produced.

In addition, in the method of producing an electrode according to the present invention, the thickness in an active material region provided on the current collector may be easily controlled, only by a simple method of controlling the thickness of the film sliced from the active material bulk. In addition, since the pores through which an electrolyte solution and the like permeate are maintained uniformly and constantly, the thickness in the active material region provided on the current collector is not substantially restricted.

Besides, even in the case in which design modification of the density of the active material region, the porosity of the active material region, the thickness of the active material region, and the like is performed, various electrode production is possible only by producing the active material bulk satisfying the design conditions, and thus, the degree of design freedom is very high, and building (or change) of an electrode production facility depending on the electrode design modification is not required.

In addition, in the case of the conventional slurry-based technique, supply and management of various materials such as an active material, a conductive material, a binder, and a solvent should be performed, and the electrode is produced, based on a highly multi-step process such as slurry mixing, coating, drying, pressing, and slitting. In addition, in the case of the slurry production process, since the electrode active material slurry produced by gradually increasing the concentration (solid concentration) from a low concentration to a high concentration, it is difficult to manage the production process, for example, slurry concentration adjustment should be performed with difficulty considering characteristics of dispersion and precipitation reduction. In addition, in the case of a positive electrode, the production process is complicated and the process facility and management are difficult, for example, an organic solvent recovery device should be separately provided when producing the slurry.

However, since the method of producing an electrode according to the present invention is based on the active material bulk, rather than the slurry, the organic solvent recovery device (step) is unnecessary or may be minimized, the electrode may be produced by a significantly simplified process of production, slicing, and adhesion of the active material bulk, and costs of the process facility and management may be significantly decreased.

In addition, in the conventional slurry-based technique, since the pore structure is unintentionally collapsed in a rolling process of the active material Layer, there is a problem that it is difficult to substantially implement both higher density and maintenance of voids. However, in the production method according to the present invention, since the pore structure and the porosity of the active material bulk already having physically (mechanically) stable strength are maintained as they are on the cut film (active material film), both higher density and maintenance of voids impregnated with an electrolyte solution may be implemented.

Accordingly, in the method of producing an electrode according to an exemplary embodiment of the present invention, the pore structure of the active material film may be controlled only by adjusting the pore structure of the active material bulk, and also the porosity of the active material film may be controlled by the porosity of the active material bulk.

The method of producing an electrode according to an exemplary embodiment of the present invention may be a method of producing an electrode for an electrolyte solution-based secondary battery, advantageously an electrode for an electrolyte solution-based lithium secondary battery, and more advantageously a lithium secondary battery including a positive electrode; a negative electrode; a separator interposed between the positive electrode and the negative electrode; and an electrolyte solution.

This is because a problem to be solved in the present invention is to provide a method of producing an electrode through which an electrolyte solution may permeate smoothly and is capable of high loading and/or being highly mixed, in the electrode provided in the lithium secondary battery including an electrolyte solution.

The method of producing an electrode according to an exemplary embodiment of the present invention may include a method of producing a negative electrode or a method of producing a positive electrode, depending on the kind of electrode active material.

That is, when the particulate electrode active material included in a raw material is a negative electrode active material, the method of producing an electrode according to an exemplary embodiment may correspond to the method of producing a negative electrode.

In addition, when the particulate electrode active material included in a raw material is a positive electrode active material the method of producing an electrode according to an exemplary embodiment may correspond to the method of producing a positive electrode. Thus, the method of producing an electrode according to the present invention should not be limitedly interpreted as a method of producing a positive electrode or negative electrode.

In the method of producing an electrode according to an exemplary embodiment of the present invention, a step of using a raw material including a particulate electrode active material to produce an active material bulk may be a step of using a raw material including particulate electrode active material to produce an active material bulk capable of free-standing. In other words, the active material production step may be a step of producing a physically integrated active material bulk from a raw material including a particulate electrode active material by applying pressure (in the case of a molded body) or applying pressure and heat (in the case of a sintered body).

The raw material may include a particulate electrode active material, and the particulate particles may be in the form of a sphere, a flake (scale), an agglomerate, an amorphous shape, a plate, a rod, a crystal (crystal shape composed of thermodynamically stable crystal planes), polyhedron, or a combination thereof, but are not limited thereto.

The electrode active material included in the raw material may include one electrode active material; or two or more electrode active materials having different compositions, crystal structures, particle shapes, mechanical properties, or physical properties. Here, having a different crystal structure also includes a dimorphism case having the same composition and a different crystal structure. In addition, having a different particle shape includes the meaning of having different particle shapes from each other of one material as well as different particle shapes from each other of different materials from each other. As an example, crystal particles of one material (primary particles or crystalline particles) and aggregated particles of the same material (secondary particles), sphere particles of one material and flake particles of the same material, and the like may be included, but which is only suggested for clear understanding, and the present invention is not limited thereto. In addition, the mechanical properties may include one or more selected from the group hardness, strength, toughness, ductility, and the like, and the physical properties may include one or more properties selected from the group comprising electrical conductivity, thermal conductivity, a coefficient of thermal expansion, specific gravity, and the like.

As an example, the electrode active material included in the raw material may be a negative electrode active material, and as the negative electrode active material, any material may be used as long as it is commonly used in the negative electrode of a secondary battery. As a specific example, the negative electrode active material may include easily graphitizable carbon; poorly graphitizable carbon; natural graphite; artificial graphite; carbon nanotubes; graphene; silicon; Sn alloys; Si alloys; oxides of one or two or more elements selected from the group comprising Sn, Si, Ti, Ni, Fe, and Li (as an example, Sn oxides, Si oxides, Ti oxides, Ni oxides, Fe oxides (FeO), and lithium-titanium oxides ($LiTiO_2$, $Li_4Ti_5O_{12}$)); or a mixture thereof, but is not limited thereto.

As another example, the electrode active material included in the raw material may be a positive electrode active material, and as the positive electrode active material, any material capable of reversible desorption/intercalation of ions (as an example, lithium ions) involved in charge/discharge may be used, and an electrode material used in the positive electrode or a common secondary battery is fine.

As a representative example, the positive electrode active material may be one or more selected from the group consisting of cobalt, manganese, and nickel and one or more of composite oxides of lithium. An example of the composite oxide may include the following: $Li_xMn_{1-y}M_yA_2$, $Li_xMn_{1-y}M_yO_{2-z}X_z$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA_\alpha$, $Li_xNi_{1-y-z}Co_yM_zO_{2-\alpha}X_\alpha$, $Li_xNi_{1-y-z}Mn_yM_zA_\alpha$, $Li_xNi_{1-y-z}Mn_yM_zO_{2-\alpha}X$, wherein $0.9 \le x \le 1.1$, $0 \le y \le 0.5$, $0 \le z \le 0.5$, and $0 \le \alpha \le 2$, M and M' are identical to or different from each other and selected, from the group consisting of Mg, Al, Co, K, Na, Ca, Si, Ti, Sn, V, Ge, Ga, B, As, Zr, Mn, Cr, Fe, Sr, V, and rare earth elements, A is selected from the group consisting of O, F, S, and P, and X is selected from the group consisting, of F, S, and P.

As a representative example, the positive electrode active material may include a lithium-metal oxide having a layered structure; a lithium-metal oxide having a spinel structure; a lithium-metal phosphate having an olivine structure; or a mixture thereof. More specifically, the lithium-metal oxide having a layered structure may include $LiMO_2$ (M is one or two or more transition metals selected from Co and Ni); $LiMO_2$ substituted with one or two or more heteroelements selected from the group consisting of Mg, Al, Fe, Ni, Cr, Zr, Ce, Ti, B, and Mn or coated with an oxide of these heteroelements (M is one or two or more transition metals selected from Co and Ni); $Li_xNi_\alpha Co_\beta M_\gamma O_2$ (x is a real number of $0.9 \le x \le 1.1$, $\alpha$ is a real number of $0.7 \le \alpha \le 0.9$, $\beta$ is a real number of $0.05 \le \beta \le 0.35$, $\gamma$ is a real number of $0.01 \le \gamma \le 0.1$, $\alpha+\beta+\gamma=1$, M is one or more elements selected from the group consisting of Mg, Sr, Ti, Zr, V, Nb, Ta, Mo, W, B, Al, Fe, Cr, Mn, and Ce); or $Li_xNi_a Mn_b Co_c M_d O_2$ (x is a real number of $0.9 \le x \le 1.1$, a is real number of $0.3 \le a \le 0.6$, b is a real number of $0.3 \le b \le 0.4$, c is a real number of $0.1 \le c \le 0.4$, a+b+c+d=1, M is one or more elements selected from the group consisting of Mg, Sr, Ti, Zr, V, Nb, Ta, Mo, W, B, Al, Fe, Cr, and Ce), but is not limited thereto. The lithium-metal oxide having a spinel structure may include $Li_aMn_{2-x}M_xO_4$ (M is one or two or more elements selected from the group consisting of Al, Co, Ni, Cr, Fe, Zn, Mg, B, and Ti, a is a real number of $1 \le a \le 1.1$, and x is a real number of $0 \le x \le 0.2$), $Li_4Mn_5O_{12}$, or the like, but is not limited thereto. A phosphate-based material having an olivine structure may include $LiMPO_4$ (M is Fe, Co, or Mn) or the like, but is not limited thereto.

In addition, the particulate particles may include composite particles having a core-shell structure as well as primary particles (crystalline particles), agglomerated particles (secondary particles), amorphous particles, spherical particles, flake particles, needle-shaped particles, and the like.

Specifically, the particulate particles may be composite particles having a core-shell of a core of electrode active material and a shell of a heteromaterial, and the heteromaterial of the shell may include a second electrode active material, an electrode active material precursor, a conductive material, a conductive material precursor, a binder (first binder), or a mixture thereof.

The constitution of the shell which may include an electrode active material precursor or a conductive material precursor is for synthesis conversion of a material which may occur in the heat application process for forming a bulk, according to an exemplary embodiment of the present invention. That is, when forming bulk of a raw material by applying heat, production of the conductive material or the electrode active material may be performed in-situ, and thus, composite particles of an electrode active material core and a precursor shell such as an electrode active material precursor or a conductive material precursor may be used in a particulate form.

As described above, though bulk formation of a raw material and material conversion of a precursor material may be carried out at the same time, if necessary, separate heat application for material conversion of a precursor material before or after bulk formation by molding or sintering may be also carried out, of course. Here, the electrode active material precursor may be a precursor of the same kind of electrode active material as the core or a precursor of an electrode active material different from the core (different kind).

When the conductivity of the electrode (negative or positive electrode) active material is poor, the shell of the composite particles may be a conductive material or a conductive material precursor. As the conductive material, any material which is known as a conductive material commonly mixed into an active material slurry for improving electric conductivity of an electrode active material layer may be used. A specific example of the conductive material may include conductive carbon bodies such as carbon black, acetylene black, Ketjen black, channel black, furnace black, lamp black, thermal black, carbon nanotubes, carbon fiber (including vapor grown carbon fiber (VGCF)), and exfoliated graphite, or a mixture thereof, but is not limited thereto.

The conductive material precursor may be any material known as a carbon precursor. As an example, the conductive material precursor may include a carbon precursor which is converted into carbon by pyrolysis. As a specific example, the carbon precursor may include one or more selected from the group comprising cokes, thermocurable resins, thermoplastic resins, and the like. Cokes may include petroleum or coal tar-based cokes (petroleum or coal tar pitch-derived cokes), and pitch may include petroleum-based pitch, coal tar-based pitch, or a mixture thereof. Pitch may include isotropic pitch, mesophase pitch, a mixture thereof, or the like. A resin used as the carbon precursor may include a thermocurable resin, a thermoplastic resins, or a mixture thereof. A thermocurable resin may include an epoxy resin, a polyester resin, a phenol resin, an alkyd (unsaturated polyester) resin, a polyimide resin, a vinylester resin, a polyurethane resin, a polyisocyanurate resin, a mixture thereof, or the like, and a thermoplastic resin may include a polyethylene resin, polypropylene resin, a polyvinylalcohol resin, a polyvinylidene chloride resin, a polyethylene terephthalate resin, a polyester resin, a polystyrene resin, a polymethylmethacrylate resin, a polyvinyl chloride resin, an acrylonitrile butadiene styrene (ABS) resin, a polyamide resin, a polycarbonate resin, a polyoxymethylene resin, an acryl resin, a polyvinylsulfde resin, a polyetheretherketone resin, a polytetrafluoroethylene resin, a mixture thereof, but are not limited thereto.

When the shell includes the carbon precursor, intercalation of ions (as an example, lithium ions) involved in charge/discharge may occur in carbon converted from the carbon precursor (pyrocarbon), as known in the art, and moreover, the carbon precursor may also serve to bind the particulate electrode active materials while being converted into carbon. Thus, the carbon precursor should not be limitedly interpreted as only a conductive material precursor, and it should not be overlooked that the carbon precursor may be also interpreted as a binder and/or an electrode active material precursor.

When the shell contains a binder (first binder), the binder may include an organic binder, and as the organic binder, a polymer commonly used in the electrode of the lithium secondary battery for binding the active materials or the active material and the current collector fine. As a specific example, the binder may include polyvinylidene fluoride, a polyvinylidene fluoride-hexafluoropropylene copolymer, a polyvinylidene fluoride-trichloroethylene copolymer, polymethyl methacrylate, polyacrylonitrile, polyvinylpyrrolidone, polyvinyl acetate, a polyethylene-vinyl acetate copolymer, polyethylene oxide, cellulose acetate, cellulose acetate butyrate, cellulose acetate propionate, cyanoethylpulluran, cyanoethylpolyvinylalcohol, cyanoethylcellulose, cyandethylsucrose, pullulan, carboxymethylcellulose, a styrene-butadiene copolymer, an acrylonitrile-styrene-butadiene copolymer, polyimide, polytetrafluoroethylene, or a mixture thereof, but the present invention is not limited to those binder materials, of course.

When the raw material includes the electrode active material in a composite particle form of electrode active material core-binder shell, according to a specific bulk formation method, the active material bulk may contain a binder derived from a shell of the composite particles (organic binder), or carbon remaining after carbonization or pyrolysis of the binder (organic binder) contained in the shell of the composite particles.

As a specific example of using the composite particles to produce the active material bulk, the active material bulk production step may include press-molding a raw material including composite particles having a core-shell structure of electrode active material core-carbon precursor shell as a particulate electrode active material to produce a molded body; and heat-treating the molded body to pyrolyze a carbon precursor of the shell into carbon. Here, the electrode active material core may be a positive electrode active material or a negative electrode active material.

The raw material may further include one or more additives selected from the group comprising a binder (second binder), a conductive material, a carbon precursor, and a pore forming agent, together with the particulate electrode active material described above.

In addition, when the raw material includes a binder, or more uniform and rapid mixing of materials is required, the raw material may further include a solvent that dissolves a binder contained as an additive (second binder) or a dispersion medium which disperses the raw material.

The binder included in the raw material as the additive (second binder) may be an aqueous organic binder and/or non-aqueous organic binder which is/are used in a common secondary battery. Specifically, the non-aqueous binder may include vinylidenefluoride-hexafluoropropylene copolymer (PVDF-co-HEP), polyvinylidenefluoride, polyacrylonitrile, polymethylmethacrylate, polyvinylalcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylenepropylene-diene monomer (EPDM), a sulfonated ethylenepropylene terpolymer (EPDM), polytetrafluoroethylene (PTFE), polyvinylidene fluoride (PVdF), and the like, and the aqueous binder may include acrylonitrile-butadiene rubber, styrene-butadiene rubber, acryl rubber, or the like, but the present invention is not limited thereto.

Depending on the specific method of bulk formation of molding or sintering, the active material bulk contains a binder added as an additive, or contains carbon remaining after carbonation or pyrolysis of the binder added as an additive.

The conductive material is not particularly limited, as long as it is commonly used for improving, the conductivity of the active material layer in the secondary battery field. As an example, the conductive material may include particles, fibers, nanostructures, mixtures thereof, or the like of one or two or more materials selected from the group comprising conductive carbon, conductive polymers, and metals.

For example, one or two or more materials selected from the group comprising conductive carbon, conductive polymers and metals (conductive material) may include artificial graphite, natural graphite, soft carbon, hard carbon, carbon black, acetylene black, Ketjen black, Denka black, thermal black, channel black, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, zinc oxide, potassium titanate, carbon fluoride, polyaniline, polythiophene, polyacetylene, polypyrrole, a combination thereof, or the like.

The conductive material may have a particle shape (including amorphous shape), a plate shape, a rod shape, a wire shape (fibrous shape), or a mixed shape thereof, of the conductive material described above, and a nanostructure of the conductive material described above may be included together with or instead of the conductive material. The nanostructure may be one or two or more selected from the group comprising nanowire, nanotubes, nanoplates, nanoribbon, nanoparticles, and nanorods. The nanostructure may secure uniform and excellent electrical conductivity in all directions of the active material bulk (and active material film) by the network of the nanostructure.

Here, the conductive material may serve to improve the electrical conductivity of the active material bulk and the active material film, and also serve as a binding agent which binds the active material particles when melting and binding (including partial melting) of the conductive material occur by a heat treatment process for producing a sintered body or a separate energy application process.

A pore forming agent may be removed by decomposition or dissolution in the bulk forming process of the raw material or after bulk formation. As the pore forming agent, any polymer having a carbonization yield of 40% or less, specifically a carbonization yield of 1 to 20% may be used. Here, the carbonization yield of a polymer may be a carbonization yield based on the condition of 900° C. carbonization under $N_2$ reduction gas atmosphere having a purity of 99.99% or more.

More specifically, the pore forming agent may be a polymer having a carbonization yield of 40% or specifically 1 to 20%, and a content of fixed carbon in remaining carbon of 99 wt % or more. A specific example of the pore forming agent which forms residual pores in the active material bulk may include polystyrene, polyvinylalcohol, polyvinylchloride, epoxy resin, phenol resin, polypropylene, a mixture thereof, or the like, but is not limited thereto. The pore forming agent may have a spherical shape or fibrous shape, but is not limited thereto.

The carbon precursor included in the raw material as an additive may include one or more selected from the group comprising cokes, pitch, thermocurable resins, and thermoplastic resins. Cokes may include petroleum or coal tar-based cokes (petroleum or coal tar pitch-derived cokes), and pitch may include petroleum-based pitch, coal tar-based pitch, or a mixture thereof. Pitch may include isotropic pitch, mesophase pitch, a mixture thereof, or the like. A resin used as the carbon precursor may include a thermocurable resin, a thermoplastic resins, or a mixture thereof. A thermocurable resin may include an epoxy resin, a polyester resin, a phenol resin, an alkyd (unsaturated polyester) resin, a polyimide resin, a vinylester resin, a polyurethane resin, a polyisocyanurate resin, a mixture thereof, or the like, and a thermoplastic resin may include a polyethylene resin, a polypropylene resin, a polyvinylalcohol resin, a polyvinylidene chloride resin, a polyethylene terephthalate resin, a polyester resin, a polystyrene resin, a polymethylmethacrylate resin, a polyvinyl chloride resin, an acrylonitrile butadiene styrene (ABS) resin, a polyamide resin, a polycarbonate resin, a polyoxymethylene resin, an acryl resin, a polyvinylsulfide resin, a polyetheretherketone resin, a polytetrafluoroethylene resin, a mixture thereof, but are not limited thereto. Without particular limitation thereto, the resin used as the carbon precursor may have a carbonization yield of 10% or more, specifically 30 to 90%, and more specifically 40 to 90%. Here, when a resin-based carbon precursor having a carbonization yield of 40% or less is used, the carbon precursor may also serve as the pore forming agent. As described above, carbon which is produced by pyrolysis of carbon precursor (pyrocarbon) may serve as a conductive material and as a binding, agent which binds the active materials, and also, may serve as the active material involved in a charge/discharge reaction.

Here, the pyrocarbon is not interpreted limitedly as carbon derived from the carbon precursor, but may be interpreted as also including residual carbon derived from the pore forming agent or an additive such as an organic binder by a heat treatment for producing a sintered body or if necessary, a heat treatment process which is independently performed with the heat treatment for producing a sintered body.

As a specific example of using a raw material including an additive to produce the active material bulk, the active material bulk production step may include press-molding a raw material including a particulate electrode active material and a carbon precursor to produce a molded body; and heat-treating the molded body to pyrolyze the carbon precursor into carbon. Here, the electrode active material core may be a positive electrode active material or a negative electrode active material.

Considering the use of an electrode to be produced, electrical properties of the electrode active material, porosity to be desired, and the like, the kind, the content, and the like of additive included in the raw material may be adjusted, of course.

When the raw material includes a conductive material, the conductive material may be included at 1 to 30 parts by weight, as a specific example, 1 to 20 parts by weight, based 100 parts by weight of the electrode active material, but is not necessarily limited thereto.

When the raw material includes a binder, the binder may be included at 0.5 to 10 parts by weight, based on 100 parts by weight of the electrode active material, but is not necessarily limited thereto.

When the raw material includes a carbon precursor, the electrode active material may be included at 1 to 30 parts by weight, as a specific example, 1 to 25 parts by weight, based on 100 parts by weight of the electrode active material, but is not necessarily limited thereto.

When the raw material includes a pore forming agent, the pore forming agent may be included at 1 to 20 parts by weight, based on 100 parts by weight of the electrode active material, but is not necessarily limited thereto.

However, the raw material may not include the conductive material, the binder, the carbon precursor, and/or the pore forming agent, of course, and as a simple example, the active material bulk may be composed of the electrode active material.

In addition, if necessary, the raw material may further include a binder, or a solvent of the carbon precursor or a dispersion medium for dispersion, but the present invention may not be limited by whether the solvent or dispersion medium is used or not, or the specific content thereof, of course.

Specifically, when mixing the raw material is wet mixing, the solvent or the dispersion medium may be used, and in the case of dry mixing, the solvent or the dispersion medium may not be used.

As the solvent (aqueous solvent or organic solvent) included in the raw material, an aqueous solvent or an organic solvent which is commonly used in the production of a positive or negative electrode active material slurry in the field of a secondary battery, is fine. Specifically, the aqueous solvent may include solvents such as water, isopropyl alcohol, propanol, methanol, ethanol, and the organic solvent may include acetone, N-methyl-2-pyrrolidone (MMP), dimethylformamide, dimethylacetamide, chloroform, dichloromethane, trichloroethylene, normal hexane, N,N-dimethylaminopropylamine, ethylene oxide, tetrahydrofuran, a mixed solvent thereof, or the like, but is not limited thereto.

In the production method according to an exemplary embodiment of the present invention, the active material bulk may be a molded body produced by applying physical force to the raw material or a sintered body produced by applying heat to the molded body.

In the molded body, the electrode active material undergoes plastic deformation and is bound to each other to have constant strength, and in the sintered body, water is bound integrally by sintering to have constant strength. Thus, the active material bulk which is the molded body or the sintered body may be a binder-free active material bulk containing no organic binder, and accordingly, an active material film or a binder-free active material film may be produced. However, this is an example which is possible by the production method according to an exemplary embodiment of the present invention in which an active material bulk which is a molded body or a sintered body is produced and sliced to produce the active material film, and in the present invention, the binder-free active material bulk is not limited to the binder-free active material film.

When the active material bulk which is the molded body is intended to be produced, the active material bulk production step may be performed by unidirectional, bidirectional, or isotropic compression molding of the raw material. Specifically, the production step of the active material bulk which is the molded body may include mixing the raw material; and press (compression)-molding the mixed raw material.

Mixing of the raw material may be dry or wet mixing. The dry mixing may be performed by mixing the particulate electrode active material with an additive such as a carbon precursor without using a solvent (or a dispersion medium). In the case of wet mixing, the solvent or the dispersion medium is used, but mixing may be performed in the state in which the solid content is very high (as an example, a solid content of 60 wt % or more, as a specific example, a solid content of 70 wt % or more), unlike the conventional active material slurry production process, thereby significantly decreasing the usage of the aqueous solvent or the organic solvent which is used as the solvent or dispersion medium. When the wet mixing is performed, a drying step of removing the solvent (or dispersion medium) by volatilization before the molding or after the molding, may be further performed.

The compression molding may be performed by introducing the mixed raw material to a mold having an internal accommodation space corresponding to the three-dimensional shape and size of the bulk to be desired, and applying a compressive force to the raw material by uniaxial pressing, biaxial pressing, or isotropic pressing. The pressure applied during the molding may be properly adjusted, considering the kind and sintering characteristics of the material included in the raw materal, designed porosity, and the like. As a specific example, the molding may be performed at a pressure of 10 to 120 MPa, but is not limited thereto.

In the active material bulk which is the molded body, the electrode active material may contain a material capable of plastic deformation, as a specific example, a negative electrode active material, as a substantial example, one or more carbon-based negative electrode active material selected from natural graphite and artificial graphite. In this case, since plastic deformation of the electrode active material occurs when press (compression) molding, a three-dimensional body capable of free-standing may be produced using a minimal additive. In addition, independently of this, the electrode active material is plastically deformed by compression, so that the shape thereof is deformed into a pressed shape in the pressure application direction, that is, a pressed particle, and the orientation of the electrode active material may be formed in the active material bulk by the pressed particles (electrode active material particles). The orientation of the electrode active material is advantageous, since it may improve charge and discharge rate characteristics of the electrode. In this respect, when the active material bulk is a molded body, it is preferred that the mixed raw material is introduced to the mold and then the molded body is produced by uniaxial pressing or biaxial pressing.

However, the present invention should not be limitedly interpreted as causing an orientation by only plastic deformation. As an example, when the electrode active material has a plate shape or flake shape such as scale-shaped graphite-based active materials, an orientation may be already formed in the process of introducing the raw material to a mold for molding and packing, and in the bulk preparation step, magnetic field is applied in a liquid kneaded stat e to control the orientation. In addition, the negative electrode active material contains both the scale-shaped graphite-based active material and spherical natural graphite, the scale-shaped graphite-based active material may be oriented in vertical direction to the compressive force for molding and the spherical natural graphite may be plastically deformed and oriented in a vertical direction to the compressive force.

FIG. 1 is a drawing illustrating molded body 200 produced by compression molding of a raw material 100 including carbon-based negative electrode active material particles 110 before molding, and pressed particles 210 of a carbon-based negative electrode active material in the molded body 200, when the electrode active material material capable of plastic deformation, and as a specific example carbon-based negative electrode active material. As in an example shown in FIG. 1, pressed particles 210 formed by the carbon-based negative electrode active material particles 110 deformed in a constant direction by compression molding may be formed, and by these pressed particles, an orientation (indicated by an arrow in FIG. 1) of the electrode active material particles may be formed in the molded body 200.

An active material bulk is produced by the production method according to an exemplary embodiment of the present invention, and sliced to produce an active material film adhered a current collector, thereby controlling an orientation in a thickness direction of the active material film (oriented direction of the electrode active material particles), along the cutting direction in which the active material bulk having an orientation of the electrode active material is sliced.

It substantially difficult to implement the orientation of the electrode active material film, in the conventional slurry-based electrode production technique of applying and rolling of a slurry. This is because when an active material slurry is applied on a current collector and rolled, and plastic deformation (permanent deformation) of the active material occurs, the orientation of the plastically deformed electrode active material particles should be limited to a direction parallel to an interface direction of the current collector and the active material layer (identical to an in-plane direction of an active material layer surface).

However, as in an example shown in FIG. 2, the oriented direction of the electrode active material based on the thickness direction of the active material film 300 may be controlled, only by adjusting the cutting direction (CD in FIG. 2) of the active material bulk 200 having an orientation of the electrode active material.

In particular, as in an example shown in the lower part of FIG. 2, when the cutting direction (CD) of the active material bulk 200 is parallel to the pressed direction of the pressed particles, that is, in vertical direction to the pressed surface of the pressed particles, the thickness direction of the active material film 300 and the oriented direction of the active material particles (pressed particles) are substantially parallel to each other, and thus, electrolyte solution impregnation into a space between particles and diffusion of ions involved in charge/discharge such as lithium ions may be performed more smoothly.

In contrast, the active material bulk may be a sintered body, and the active material bulk which is sintered body may be produced by applying heat to a raw material (or molded body). Specifically, when the active material bulk is a sintered body, the production method according to an exemplary embodiment of the present invention may include introducing a raw material to a mold and molding the material to produce a molded body; and applying heat to the molded body to produce a sintered body. Here, the molded body production step and the sintered body production step may be performed simultaneously. That is, the sintered body may be produced by applying physical force together with heat simultaneously to the raw material. A specific example of applying mechanical force (physical force) together with heat may include hot press sintering and the like. Heat may be applied by a heat treatment using a common furnace, but is not limited thereto, and the heat application may be performed using any method known to be used for producing a sintered body such as spark plasma sintering (SPS). Here, the atmosphere may be controlled, considering the kind of specific electrode active materials during the heat treatment (heat application), of coarse. As an example, when the electrode active material includes a carbon-based active material, the heat treatment may be performed in a non-oxidizing atmosphere such as nitrogen and argon, and when the electrode active material includes an oxide-based active material, the heat treatment may be performed in an oxygen-containing atmosphere such as the air.

When the active material bulk which is a sintered body produced, the electrode active material of the raw material may be a positive electrode active material or negative electrode active material. As an example, when the active material bulk which is a sintered body is intended to be produced, the electrode active material of the raw material may include a positive electrode active material or non-carbon-based negative electrode active material. The sintered body has an interparticle grain boundary or neck of an active material formed by heat application (as a specific example, heat treatment) and may be in the state in which the particulate electrode active material integrally bound (melted). Otherwise, in contrast, the sintered body may be in the state in which the active material particles are bound to each other by pyrocarbon (carbon precursor-derived pyrocarbon). When the active material bulk is a sintered body of the electrode active material, the pore structure, the porosity, or the like may be easily controlled by an average size, distribution, and a sintering degree of the electrode active material particles.

As a specific example, the active material bulk may be a sintered body in which the electrode active material particles of the raw material are bound to each other while forming a neck. FIG. 3 is drawing illustrating active material particles 210 which are bound to each other by the neck (indicated by an arrow in FIG. 3), based on the two electrode active material particles 110 adjacent to each other in the raw material. As is known, the sintering process is divided into an initial stage, a middle stage, and a terminal state, and in the initial sintering stage, a neck is formed between the particles. Though it depends somewhat on the kind and content of additive included in the raw material, the initial sintering stage may correspond to a stage in which a sintering shrinkage is about 3 to 10% (vol %), specifically reaches 3 to 7%. In the initial sintering stage, most pores in the molded body are substantially present as open pores, mostly mass transfer (diffusion) occurs by a contact point of particles, and particles are connected by a neck. Accordingly, when the sintered body is a product in the initial sintering stage of forming an interparticle neck of an electrode active material, the sintered body may contain large amount of open pores while having mechanical (physical) strength capable of stable handling during processes such as cutting, transfer, and adhesion and process performance, and thus, very advantageous in terms of electrolyte solution impregnation and electrochemical reaction area improvement. In addition, even though the cut film is in the form of a thick film, may have a structure in which a large amount of open pore channels penetrate the cut film regardless of the cutting direction, and thus, the electrolyte solution may permeate uniformly in the thickness direction of the cut film.

However, in the present invention, the sintered body may not be interpreted limitedly as being a state of being connected by the interparticle neck of an electrode active material, and as described above, the sintered body may be interpreted as a product obtained by subjecting the molded body or the raw material to heat, specifically heat energy capable of mass transfer, substantially a heat treatment at 300° C. or higher, more substantially a heat treatment at 500° C. or higher, and still more substantially a heat treatment at 600° C. or higher.

In addition, depending on the specific material of the raw material, burn-out of a pore forming agent, binding of a conductive material and an active material (including melt binding of the conductive material), burn-out of a binder, carbonization of the binder, conversion of an electrode active material precursor into an electrode active material, conversion of a carbon precursor into carbon (pyrocarbon), and/or graphitization treatment of pyrocarbon, and the like may be performed, by heat application for sintered body production or if necessary, by a separate independent heat treatment process after producing the sintered body.

As an example, when the negative electrode active material is a material which is difficult to be plastically deformed, such as hard carbon or soft carbon, or though the negative electrode active material is a material capable of plastic deformation if necessary, such as natural graphite, a raw material including the particulate electrode active material (hard carbon, soft carbon, natural graphite, and the like) and a carbon precursor is molded to produce a molded body, and then heat is applied thereto to convert the carbon precursor into carbon, thereby producing the active material bulk in the form of a sintered body. In this case, the sintered body may be in the state in which the particulate electrode active materials are at least bound carbon converted from the carbon precursor (pyrocarbon).

That is, the active material bulk may include a particulate active material and pyrocarbon which binds the particulate active material, and the active material film produced from the active material bulk may also include the particulate active material and the pyrocarbon binding the electrode active material particles.

In the conventional slurry-based electrode production technique, the slurry of particles should be applied on a current collector to maintain a layer structure of active material "mixed layer", and thus, the electrode active material fraction in the active material layer is inhibited and the electrical properties are decreased, but the use of the binder was inevitable.

However, in the production method according to an exemplary embodiment of the present invention, a sintered body capable of free-standing may be produced by interparticle grain boundary or neck formation of the electrode active material, binding by carbon converted from a carbon precursor (pyrocarbon), or the like.

Accordingly, the active material bulk may be a binder-free sintered body, and the active material film produced by cutting the sintered body may be a binder-free film containing no binder. Here, binder-free may be interpreted as containing no organic binder. Experimentally, binder-free may mean that when a weight reduction rate of an electrode is measured by heating the electrode up to 600° C. at a heating rate of 5° C./min under an inert atmosphere such as Ar, the weight reduction rate is within 2%, substantially within 1%, or more substantially within 0.5%, and still more substantially, the weight reduction does not occur within an error range.

Carbon derived from a carbon precursor, specifically pyrocarbon may serve as a conductive material for improving conductivity and serve to bind the particulate active material, and also function as an active material capable of lithium intercalation.

Thus, binder-free may be interpreted as organic binder-free, and a binder-free active material bulk (binder-free molded body or binder-free sintered body) may mean a molded body or a sintered body containing no organic binder. As a specific example, the binder-free sintered body may include a sintered body composed of an active material; a sintered body composed of an active material and residual carbon (residual carbon by organic binder decomposition or the like); a sintered body composed of an active material and a conductive material; a sintered body composed of an active material, a conductive material, and residual carbon; a sintered body composed of an active material and a carbon precursor-derived carbon; a sintered body composed of an active material, a carbon precursor-derived carbon, and residual carbon; a sintered body composed of an active material, a conductive material, and a carbon precursor-derived carbon; a sintered body composed of an active material, a conductive material, a carbon precursor-derived carbon, and residual carbon, and the like.

As described above, by the production-methodical configuration of the present invention, the active material film may be a binder-free film containing no organic binder. Without limitation to this, the active material film which is a binder-free film may be composed of an electrode active material, composed of an electrode active material and a conductive material, or composed of an electrode active material and carbon serving as a binder.

However, the binder-free active material film may be produced by the production-methodical configuration of the present invention, and if necessary, the active material film of the present invention may contain an organic hinder, of course, and the present invention should not be interpreted as excluding the active material film containing an organic binder or the active material bulk containing an organic binder.

In addition, the active material bulk is a sintered body, the molded body formed before sintering may contain an organic binder, of course, and the organic binder may burned out in the sintering process so that a binder-free sintered body may be produced, of course. The organic binder may leave residual carbon or not, depending on the process atmosphere during burn-out. When the process atmosphere is an oxidative atmosphere, the residual carbon may not be left, and the active material particles only serve to assist physical integration before sintering. In addition, the burn-out atmosphere a non-oxidative atmosphere, the organic binder may serve to coat an active material particle surface with carbon while leaving residual carbon, or bind particles with the residual carbon.

In addition, when the raw material further includes an additive which is a binder, together with the particulate electrode active material, an electrode active material which is difficult to be plastically deformed, as an example, a non-carbon-based negative electrode active material, hard carbon or soft carbon, a positive electrode active material, and the like may be produced into the active material bulk in the form of a molded body, of course.

In addition, when the raw rate material further includes an additive which is a conductive material, together with the particulate electrode active material, it is possible to produce the active material bulk in which the conductive material is uniformly dispersed and incorporated, and in particular, when the conductive material includes a nanostructure, it is possible Produce the active material bulk in which a continuous current migration path is formed by the network of the nanostructure. In addition, the conductive material contained in the active material bulk may be deformed, compressed, softened, or partially melted by pressure or pressure and heat applied for bulk formation, and may be in the state of being bound to the conductive material or to the electrode active material.

In addition, when the particulate electrode active material is composite particles having a core-shell structure, the composite particles themselves may be used, and core particles (electrode active material particles) and a shell material are used, respectively to produce the composite particles having a core-shell structure in the mixing process of the raw material, of course.

As a substantial example, when the electrode active material is a carbon-based negative electrode active material, a raw material including core-shell composite particles of carbon-based negative electrode active material core-carbon precursor shell is press-molded to produce a molded body, and then heat-treated to convert the carbon precursor of the shell into carbon to produce the active material bulk. In contrast, a raw material including carbon-based negative electrode active material core particles and a carbon precursor (melt phase, solid or dissolved phase dissolved in a solvent) is mixed and press-molded to produce a molded body, which is then subjected to heat treatment to convert the carbon precursor in the state of being coated on core particles into carbon to produce the active material bulk.

In a substantial example described above, the carbon precursor may serve as a binder in the molded body. In this case, even after the carbon precursor converted into carbon by heat treatment, the active materials may be bound to each other to provide a conductive path, and to produce the carbon-based active material bulk composed of a carbon-based material, which are advantageous. In addition, the carbon-based active material bulk may be prepared with low-priced plate graphite instead of high-priced spherical graphite, as a carbon-based electrode active material. When an electrode is produced using plate graphite by a general electrode production method, scale-shaped graphite is oriented in a direction parallel to a current collector by rolling, and thus, electrolyte solution impregnation becomes difficult in a vertical direction to the electrode or a charge/discharge rate characteristic is decreased by a slowdown phenomenon. However, when the production method according to exemplary embodiment of the present invention is used, a cutting direction of the active material bulk is adjusted when producing an electrode using plate graphite, whereby the scale-shaped graphite has an orientation in vertical direction the electrode current collector, and thus, electrolyte solution impregnation becomes easy and a battery reaction rate may be improved. In addition, a pore forming agent and/or a pore retention structure may be used during the orientation, or porosity may be adjusted using molding pressure and the like, and thus, the conventional problem when using scale-shaped graphite may be solved and the method of the present invention is commercially advantageous.

A pore retention structure has a concept distinct from the pore forming agent, and is not a plate and active material particles representing an average particle diameter of at least ½ or less of the plate graphite, and is disposed to be dispersed between plate particles so that the plate graphite is completely stuck surface to surface, and thus, when porosity is small, the pore retention structure may refer to an active material which is disposed between plate graphite particles and the surface of the particles and serves to leave a space between surfaces. As a specific example any well-known negative electrode active material such as hard carbon, soft carbon, granulated artificial graphite, artificial graphite in the form of amorphous particles, mesocarbon microbeads (MCMB), spherical natural graphite, and $Li_4Ti_5O_{12}$ may be used.

As described above, even when the plate graphite is used as a particulate electrode active material plate graphites are packed by press molding, thereby producing a molded body having an orientation in a particle unit. Here, a carbon precursor (in the form of composite particles or an additive separate from the active material) is used together with the plate graphite, thereby improving molding strength, of course.

The carbon-based precursor may be converted (pyrolysis) into carbon by a heat treatment to improve electrical conductivity of the active material bulk, and if necessary, selectively, a graphitization heat treatment may be further performed to convert the carbon-based precursor into a negative electrode active material, of course. Pyrolysis may be performed in the conventionally known conditions considering specific materials of the carbon-based precursor, and a graphitizaton treatment may be also performed in the conventionally known conditions used in graphitization of carbon. As an example, pyrolysis may be performed at a temperature of 600 to 1500° C., and graphitization may be performed at a temperature of 2800° C. or higher, but is not limited thereto.

That is, the production method according to an exemplary embodiment may include molding a raw material including an active material and a carbon precursor or a raw material including an active material, a carbon precursor, and a conductive material to produce a molded body; and heat-treating the molded body to produce a sintered body. Here, during the heat treatment for sintering, pyrolysis of the carbon precursor may be performed simultaneously. If necessary, a step of heat-treating the sintered body for more complete pyrolysis to produce a secondary sintered body in which the carbon-based precursor is pyrolyzed into carbon, may be further performed. In addition, if necessary, in order to graphitize pyrocarbon, a step of heat-treating the sintered body or the secondary sintered body to produce a sintered body in which pyrocarbon is graphitized, may be further performed.

In a specific example of the present invention, the active material bulk which is a molded body or a sintered body may have an apparent porosity of 10 to 45%, specifically 15 to 40%. In addition, the active material film may have an apparent porosity of 10 to 45%, specifically 15 to 40%. Since the active material film is produced by slicing the active material bulk, the active material film may have substantially the same porosity as the active material bulk.

The composition of the active material bulk (and active material film) may vary depending on the kind and content of additive included in the raw material. When the raw material contains a conductive material, that is, the active material film contains a conductive material, the conductive material film may be contained at 1 to 30 parts by weight, as a specific example, 1 to 20 parts by weight, based 100 parts by weight of the electrode active material, but is not necessarily limited thereto.

When the active material film contains pyrocarbon by the organic binder or the carbon precursor of the raw material, the pyrocarbon may be contained at 0.5 to 30 parts by weight, as a specific example, 1 to 25 parts by weight, based on 100 parts by weight of the electrode active material, but is not necessarily limited thereto.

After the active material bulk is produced as a molded body or a sintered body, a processing step of cutting and/or grinding the active material bulk for processing the active material bulk to have a desired dimension such as chamfer or parallelepiped may be further performed, of course.

The produced active material bulk may be cut using a method which is commonly used for cutting a semiconductor ingot which was conventionally used for producing a semiconductor wafer, such as wire saw and laser cutting, but the present invention is not limited by the specific cutting method of the active material bulk.

While the active material bulk is sliced, a cut width may be adjusted to easily adjust the thickness of the active material film and a single active material bulk is repeatedly cut, thereby mass-producing the active material films having substantially the same quality. Since the thickness of the active material film is controlled by the cut width of the active material bulk, there is no restriction on the thickness of the produced active material film, and an active material film in the form of a thick film having a thickness of 200 μm or more, which is difficult to produce by a slurry application technique, may be also easily produced. However, the present invention may not be defined by the thickness of the active material film, and the thickness of the active material film may be properly adjusted depending on the use of the active material secondary battery. As a specific example, the thickness of the active material film may range from an order of several tens of micrometers to an order several millimeters, and more specifically, may be 10 μm to 500 μm, but is not limited thereto.

FIG. 4 is a drawing illustrating a cross section of an active material film 300 produced by slicing an active material bulk which is a molded body, and FIG. 5 is a drawing illustrating a cross section of an active material film 300 produced by slicing the active material bulk which is a sintered body. For a clear understanding of FIGS. 4 and 5, FIGS. 4 and 5 illustrate the case in which the active material film (or active material bulk) is composed of an electrode active material, but as described above, the active material bulk may further include an additive, such as a conductive material, a carbon-based precursor, and/or a binder, or course.

As an example shown in FIGS. 4 and 5, the active material positioned on the surface of the active material film may be cut particulates, by the production-methodical configuration in which the active material film 300 is a cut film sliced from the active material bulk 200. Here, the cut surface of the cut particulates may be in parallel to the surface of the active material film 300. In other words, the surface of the active material film 300 may include cut surfaces of the cut particulates.

Here, when the active material bulk is a molded body as in FIG. 4, the cut particulates may mean having a shape in which internal particles are cut along, one optional plane, based on the shape of the electrode active material particles (internal particles) positioned in the inner center of the active material bulk.

In addition, when the active material bulk is a sintered body as in FIG. 5, the cut particulates may mean having a shape in which internal particles are cut along one optional plane, based on the shape of the electrode active material particles (internal particles) which are positioned in the inner center of the active material bulk and are in the state of being bound to each other. As described above and as an example shown in FIG. 5, when the active material bulk is a sintered body, the active material bulk is advantageously a sintered body at an initial sintering stage in which the interparticle neck of the electrode active material particles 110 contained as a raw material is formed. Accordingly, when the active material bulk is a sintered body, the active material bulk may mean a shape in which the electrode active material particles 110 contained as a raw material are cut along one optional plane, based on the shape of the electrode active material particles 110 contained as a raw material. In the shape which has been cut based on the electrode active material particles contained as a raw material, the cut particles should not be interpreted precisely as the cut particle form of the electrode active material particles 110 contained as a raw material. During a heat treatment for producing the sintered body, mass transfer occurs by densification or particle growth and a concave curvature region is produced at a contact point between particles, and thus, a neck region which is the concave curvature region may be appropriately considered in the cut shape, of course.

The production method according to an exemplary embodiment the present invention may further include surface-treating at least one surface of an active material film, after slicing an active material bulk to produce an active material film, before integrating, or after integrating the active material film and the current collector. The surface treatment may include a surface roughness adjustment. Specifically, the surface treatment step may be a treatment of relatively (relative to the surface of the active material film before treatment) decreasing a surface roughness of at least one surface of the active material film, a treatment of relatively increasing a surface roughness at least one surface of the active material film, or a treatment of decreasing a surface roughness of one surface of the active material film and increasing surface roughness of the other surface.

An example of the treatment of relatively decreasing the surface roughness may include surface polishing, and an example of the treatment of relatively increasing the surface roughness may include surface etching, mechanical scratch, and the like. Here, surface etching may include plasma etching, partial oxidation of a surface region when the active material film includes the carbon-based electrode active material, or the like, but the present invention is not limited thereto, and any surface treatment method which is commonly used for increasing or decreasing a surface roughness of an inorganic film or carbon-based film may be used.

After producing the active material film from the active material bulk, a step of integrating the current collector and the active material film (binding step) may be performed. Here, integration may mean a state in which the current collector and the active material film are directly bound, or the current collector and the active material film are adhered to each other.

As an example of the binding step, a metal film is directly formed on the active material film and integrated. By the configuration in which the active material film is a film sliced from the active material bulk, specifically the active material film is a film capable of free-standing, the active material film may serve as a substrate (board). Thus, a metal film is formed on one surface of the active material film, using the active material film as a substrate, thereby integrating the current collector and the active material film. A metal film may be formed by any method which is conventionally commonly used for forming an electrode or a metal film, such as deposition (including chemical and physical deposition) of metal or application and heat treatment of a conductive ink.

As another example of the binding step, the binding step may include c1) forming an adhesive layer on at least one surface of a surface of the current collector and a surface of the active material film; and c2) layering a current collector and an active material film so as to be in contact with each other, with the adhesive layer interposed therebetween.

An adhesive layer may be formed on each of one surface of the current collector, one surface of the active material film, or one surface of the current collector, and one surface of the active material film. The adhesive layer may be formed by applying an adhesive on at least one of the surface of the current collector and the surface of the active material film, when the adhesive is a fluidized bed. Application of the adhesive may be performed by any application method which is commonly used in the application in a liquid phase or dispersed phase, and for example, may be performed, as an example, by one or more application methods selected from the group comprising dip coating, spin coating, casting, bar-coating, gravure-coating, blade coating, and roll-coating, spray, screen printing, inkjet printing, electrostatic hydraulic printing, micro contact printing, imprinting, gravure printing, offset-reverse offset printing, and the like, and coating may be performed in the form of surface coating, line coating, dot coating, and the like, but is not limited thereto. When the adhesive is in the form of an independent film, the adhesive film may be adhered to at least one of the surface of the current collector and the surface of the active material film. Here, the application amount of the adhesive may be in the level of 0.1 to 1 mg/Cm$^2$, but is not limited thereto.

After an adhesive layer is formed on at least one surface of the surface of the current collector and the surface of the active material film, the current collector and the active material film are layered so as to be in contact with each other with the adhesive layer interposed therebetween, thereby adhering the active material film to the current collector. For uniform adhesion, curing of the adhesive, reinforced binding force, rapid binding, or the like, one or more of heat, light, and pressure may be applied, when the current collector and the active material film are layered. As a substantial example when the current collector and the active material film are layered, heat may be applied, and pressure with heat may be applied. A specific example of applying pressure With heat during adhesion may include hot compression and the like, and a pressure in the hot compression may be applied by pressing by a surface pressure method and a linear pressure method, and the like, but the present invention is not limited thereto.

In the binding step, the active material film may be bound to at least one surface of the current collector, that is, one surface of the current collector or each of the two opposing surfaces of the current collector.

When the active material film is intended be adhered to each of the two surfaces opposing each other of the current collector, the active material film is adhered to one surface of the two surfaces opposing each other of the current collector by steps c1) and c2), and then the active material film is adhered to the other surface of the two opposing surfaces again by steps c1) and c2), and the active material film may be adhered to each of the two surfaces opposing each other of the current collector.

In contrast, the adhesive layer is formed so that each of the two surfaces opposing each other of the current collector is in contact with the active material film with the adhesive layer interposed therebetween in step c1), and the adhesive layer and the active material film are layered so as to form a sandwich structure with the current collector being in the center in step c2), thereby adhering the active material film to each of the two surfaces opposing each other of the current collector.

As described above, the active material film of the electrode may be a film capable of free-standing, and it may be a cut film sliced from a molded body as shown in FIG. 4, or a cut film sliced from a sintered body as shown in FIG. 5.

FIG. 6 is one cross sectional view illustrating a cross section of an electrode, and is a drawing illustrating an example in which an active material film 300 containing an electrode active material 210 and conductive particles 220 is adhered to each of the two opposing surfaces of a current collector 500. The active material film 300 in FIG. 6 is an example illustrating a cut film sliced from the molded body in which the particulate electrode active material capable of plastic deformation is plastically deformed in the form of particles pressed by press molding to form an orientation of the electrode active material particles, or the electrode active material in the form of flakes is press-molded and packed in one direction to form an orientation (particle unit orientation) of the electrode active material particles. In addition, the active material film 300 in FIG. 6 is an example in which the active material bulk is sliced to form a cut surface vertically to an oriented direction of the electrode active material in the active material bulk, so that the thickness direction of the active material film and oriented direction (oriented direction of the active material particle unit) of the active material in the film are substantially in parallel to each other.

As shown in FIG. 6, when the thickness direction of the active material film 300 and the oriented direction (oriented direction of the active material particle unit) of the electrode active material are substantially in parallel to each other, gap between the particles form open pores to form a fluid transfer path across the film from the surface of the active material film to the interface with the current collector side, and the electrolyte solution (and lithium ions) may permeate stably and uniformly, substantially regardless of the thickness of the film.

In addition, as shown in FIG. 5, even when the active material film is a film having an electrode active material interparticle neck formed therein, that is, a cut film sliced from the sintered body in the initial sintering stage, likewise, pore channels across the open surface pores and the thickness of the active material film are uniformly formed by continuous gap between particles, and the electrolyte solution (and lithium ions) may permeate stably and uniformly, substantially regardless of the thickness of the film.

The adhesive layer 400 may include a resin having curability. Here, having curability means having an ability to lose flowability and be hardened by chemical change, drying (removal by volatilization of solvent), or solidification.

Specifically, the curability of a resin having curability may include curing by phase transformation (solidification) from a liquid phase (melted phase) to a solid phase, curing by removal by volatilization of a solvent, and/or curing by chemical change. Accordingly, the resin having curability may include one or two or more resins selected from the group comprising resins in the state of being dissolved in a solvent (resin solution), thermoplastic resins (resin having solidification ability by melting-solidification), photocurable resins, thermocurable resin, and chemical curable resins.

As a thermoplastic resin, any known resin which is melt (or softened) during heat application may be used. As an example, the thermoplastic resin may include a polyamide resin, a polyester resin (for example, aromatic polyester resin such as polyethylene terephthalate, and the like), a polyacetal resin, a polycarbonate resin, a polyphenylene ether resin, a polysulfide resin, a polysulfone resin, a polyether ketone resin, a polyolefin resin, a polystyrene resin, and the like, but is not limited thereto. The thermoplastic resin may be used alone or in combination of two or more.

When the adhesive layer includes the thermoplastic resin, heat is applied to the laminate which is layered so that the current collector and the active material film are in contact with each other with the adhesive layer interposed therebetween, thereby binding the active material film to the current collector by melting (or softening) and cooling of the thermoplastic resin. Here, pressure may be applied together with heat so that binding force is improved and uniform binding is formed, of course.

When the adhesive layer includes a resin solution, the adhesive layer is layered so that the current collector and the active material film are in contact with each other with the applied film of the resin solution interposed therebetween, the solvent of the resin solution is removed by volatilization to bind the active material film to the current collector. When the resin solution is used, the resin dissolved in the resin solution may include a binder material (aqueous binder and/or non-aqueous binder) described above as an example of the additive.

As described above, the adhesive layer may include a thermocurable, photocurable, and/or chemical curable resin. Here, when the light transmittance of the current collector or the active material layer is low, it is preferred that the adhesive layer contains the thermocurable resin and/or the chemical curable resin.

The thermocurable resin or chemical curable resin may be any resin known as being cured by heat or chemically, and as an example, may include an epoxy resin, an unsaturated polyester resin, a vinylester resin, an acryl resin, a phenol resin, a urea resin, a melamine resin, an aniline resin, a polyimide resin, a bismaleimide resin, and the like, but is not limited thereto. The curable resin may be used alone or in combination of two or more. When the adhesive layer contains the thermocurable resin or the chemical curable resin, it may further contain a curing agent or a curing accelerating agent which is known as being used in the corresponding resin, of course.

The adhesive layer may be conductive or non-conductive.

When the adhesive layer is non-conductive, the adhesive layer may include a non-conductive resin having curability described above.

When the adhesive layer is conductive, the adhesive layer may include one or more conductive components selected from the group comprising conductive resin, conductive particles, and conductive nanostructures. The conductive component may be mixed in a resin solution or a resin melt and applied with the resin.

As a specific example, when the adhesive layer is conductive, the adhesive layer may include one or more components selected from the group comprising conductive particles and conductive nanostructures, together with the non-conductive resin having curability described above.

As a specific example, when the adhesive layer is conductive, the adhesive layer may include a conductive resin. The conductive resin may have at least curability after removal by volatilization of a solvent (that is, curing by drying), but is not limited thereto, and may have heat or chemical curability by a functional group or have curability by solidification (phase transformation of melting-solidification), of course.

As a specific example, when the adhesive layer is conductive, the adhesive layer may include one or more components selected from the group comprising conductive particles and conductive nanostructures, together with the conductive resin.

That is, the adhesive layer may include a resin matrix, and the resin matrix may be a conductive adhesive layer which is a conductive resin having curability. Otherwise, the adhesive layer may include a resin matrix, and the resin matrix is a non-conductive resin, but the adhesive layer may be a conductive adhesive layer which is dispersed and positioned in the resin matrix and includes one or more dispersed phases selected from conductive particles and conductive nanostructures.

The conductive particles of the adhesive layer may include one or two or more particles selected from the group comprising conductive resin particles, metal particles, core-shell particles of non-conductive core-conductive shell (shell of conductive resin or metal shell), and core-shell particles of conductive core-non-conductive shell, but are not limited thereto.

The conductive nanostructure of the adhesive layer may include metal nanowire such as silver nanowire; conductive nanotubes such as carbon nanotubes; metal nanoplates such as a gold nanoplate or a silver nanoplate; two-dimensional carbon bodies as graphene; metal nanorods such as a silver nanorode; or a mixture thereof, but is not limited thereto.

The conductive resin of the adhesive layer may be polyacetylene, polypyrrole, poly(3,4-ethylenedioxythiophene) (PEDOT:PSS), poly(styrene sulfonate)), polyaniline, poly(3-methylthiophene) (P3MT), mixed resins thereof, and the like, but is not limited thereto.

In addition, the conductive or non-conductive adhesive layer may be common non-conductive films (NCF), anisotropic conductive films (ACF), conductive films (CF), or laminated films thereof, which are used for adhesion in the packaging field such as flip chip connection or chip mounting of the conventional electronic components, or may be applied films of anisotropic conductive paste (ACP), conductive paste, or non-conductive paste (NCP), but is not limited thereto.

The current collector 500 is commonly used in the secondary battery field, and any material which does not cause chemical change during battery operation and has high conductivity may be used. As a specific example, as the current collector, copper, stainless steel, aluminum, nickel, titanium, calcined carbon, graphene, carbon nanotubes, or aluminum, or stainless steel which is surface-treated with carbon, nickel, titanium, silver, graphene, carbon nanotubes, and the like, may be used. The current collector may be in the form of foam, film, mesh, felt, or perforated film. In addition, the current collector may have surface irregularities formed on the surface. The current collector having surface irregularities including a protrusion structure formed may have an increased binding area to increase binding force between the active material film and the current collector, and allow charge transfer to occur more easily.

The present invention includes an electrode for a secondary battery produced by the production method described above. Here, the secondary battery may be an electrolyte solution-based secondary battery, specifically a secondary battery including a positive electrode; a negative electrode; a separator interposed between the positive electrode and the negative electrode; and an electrolyte solution. In addition, the secondary battery includes a lithium secondary battery.

The present invention includes a lithium secondary battery including the electrode for a secondary battery produced by the production method described above. The electrode for a secondary battery produced by the production method described above in the secondary battery may be a positive electrode, a negative electrode, or a positive electrode and a negative electrode.

Also or independently, the present invention provides an electrode for a secondary battery.

The electrode for a secondary battery according to the present invention may include an active material film containing an electrode active material, a current collector, and an adhesive adhering the active material film to the current collector. Specifically, the electrode may have a structure of a current collector-adhesive layer (adhesion layer)-active material film, and may be an electrode in which the active material film is bound to one surface of the current collector or each of both surfaces of the current collector by the adhesive layer (adhesion layer).

The electrode for a secondary battery according to the present invention includes an active material film containing an electrode active material, and the active material film may be a binder-free film containing no organic binder.

The electrode for a secondary battery according to the present invention may include an active material film containing an electrode active material, and the active material film may be a film capable of free-standing.

Here, the secondary battery may be an electrolyte solution-based secondary battery, specifically a secondary battery including a positive electrode; a negative electrode; a separator interposed between the positive electrode and the negative electrode; and an electrolyte solution, and the secondary battery includes a lithium secondary battery.

In the conventional technique of producing the active material layer using the electrode active material slurry, after applying the electrode active material slurry and drying it, rolling is performed, whereby the porosity in the surface and the inside of the active material layer varies and there is a risk that the pores on the active material layer surface are blocked. However, in the present invention, since the active material film is produced by slicing the active material bulk, the active material film has uniform porosity in the thickness direction of the film, and the active material film may have substantially the same porosity and pore structure, regardless of the position in the thickness direction.

Specifically, the porosity between the surface region and the central region of the film may be substantially the same, based on the cross section of the active material film. For a ratio of a difference between porosity (P1) in the surface region and porosity (P2) in the central region (absolute value of P1−P2) divided by porosity in the central region, based on the cross section of the active material film, uniform porosity may be the ratio of 10% or less, substantially 8% or less, and more substantially 5% or less, and as an example, the two porosities may be substantially the same. Here, substantially the same means the same within a measurement error range. Experimentally, the porosity of the active material film cross section may be an area occupied by pores per unit area of the thickness cross section, in the thickness cross section across the center of the active material film. Here, the surface region may mean a region from the surface to $0.2t_0$, based on the thickness $(t_0)$ of the active material film, and the central region may mean a region to $0.1t_0$ to each of the upper portion and the lower portion (region from $0.4t_0$ to $0.6t_0$), based on the center in the thickness cross section (centerline, imaginary line of $0.5t_0$). In addition, the porosity in the surface region may mean the porosity in each of the two surfaces, as well as one optional surface of the two surfaces opposing each other. Experimentally, the porosity based on the thickness cross section may be calculated using cross section observation image by a scanning electron microscope and the like.

In the electrode for a secondary battery according to an exemplary embodiment of the present invention, the electrode active material, the active material film, or the current collector are similar or identical to those described above in the production method of the electrode for a secondary battery, and the adhesive is similar or identical to the material of the adhesive layer described above in the production method of the electrode for a secondary battery. Accordingly, the electrode for secondary battery according to the present invention includes all descriptions in the production method of the electrode for a secondary battery above.

The present invention includes secondary battery including the electrode for a secondary battery described above, specifically, a lithium secondary battery.

Also or independently, the present invention includes a lithium secondary battery.

The lithium secondary battery according to the present invention includes a positive electrode; a negative electrode; a separator interposed between the positive electrode and the negative electrode; and an electrolyte solution, and in one or more electrodes selected from the positive electrode and the negative electrode, an active material film containing an electrode active material is adhered to at least one surface of the current collector by an adhesive.

When one or more electrodes selected from a positive electrode and a negative electrode are a positive electrode, in the positive electrode, the active material film containing the positive electrode active material is adhered to at least one surface of the current collector by an adhesive. That is, the lithium secondary battery according to an exemplary embodiment of the present invention may include a positive electrode in which the active material film containing a positive electrode active material is adhered to at least one surface of the current collector by an adhesive; a negative electrode; a separator interposed between the positive electrode and the negative electrode; and an electrolyte solution. Here, the negative electrode may include a negative electrode active material layer disposed on the current collector, and the negative electrode active material in the negative electrode active material layer may be any material which is commonly used in the negative electrode of the lithium secondary battery, and the negative electrode active material may be any material capable of lithium intercalation. As a non-limiting example, the negative electrode active material may be one or two or more materials selected from the group comprising lithium (metal lithium), easily graphitized carbon, poorly graphitized carbon, graphite, silicon, an Sn alloy, an Si alloy, an Sn oxide, an Si oxide, a Ti oxide, an Ni oxide, a Fe oxide (FeO), a lithium-titanium oxide ($LiTiO_2$, $Li_4Ti_5O_{12}$), and the like.

When one or more electrodes selected from a positive electrode and a negative electrode are a negative electrode, in the negative electrode, the active material film containing the negative electrode active material is adhered to at least one surface of the current collector by an adhesive. That is, the lithium secondary battery according to an exemplary embodiment of the present invention may include a positive electrode; a negative electrode in which the active material film containing a negative electrode active material is adhered to at least one surface of the current collector by an adhesive; a separator interposed between the positive electrode and the negative electrode; and an electrolyte solution. Here, the positive electrode may include a positive electrode active material disposed on the current collector, the positive electrode active material in the positive electrode active material layer may be any material capable of reversible desorption/intercalation of lithium ions, and may be any electrode material used in the positive electrode of the common lithium secondary battery. As an example, the positive electrode active material may be an oxide having a layered structure represented by $LiCoC_2$, an oxide having a spinel structure represented by $LiMn_2O_4$, or a phosphate-based material having an olivine structure represented by $LiFePO_4$.

When one or more electrodes selected from a positive electrode and a negative electrode are a positive electrode and a negative electrode, the lithium secondary battery according to an exemplary embodiment of the present invention may include a positive electrode in which the active material film containing a positive electrode active material is adhered to at least one surface of the current collector by an adhesive; a negative electrode in which the active material film containing a negative electrode active material is adhered to at least one surface of the current collector by an adhesive; a separator interposed between the positive electrode and the negative electrode; and an electrolyte solution.

In the lithium secondary battery according to an exemplary embodiment of the present invention, the electrode active material, the active material film, or the current collector are similar or identical those described above in the production method of the electrode for a secondary battery, and the adhesive is similar or identical to the material of the adhesive layer described above in the production method of the electrode for a secondary battery. Accordingly, the lithium secondary battery according to the present invention includes all descriptions in the production method of the electrode for a secondary battery above.

The separator may be any micro porous film which permeates lithium ions and electrically insulates the positive electrode and the negative electrode in the common lithium secondary battery. As a specific example, the separator may be a porous polymer film, for example, a porous polymer film prepared with a polyolefin-based polymer such as an ethylene homopolymer, a propylene homopolymer, an ethylene/butene copolymer, an ethylene/hexene copolymer, and an ethylene/methacrylate copolymer, alone or a laminate thereof, or a common porous nonwoven fabric, for example, a nonwoven fabric made of glass fiber having a high melting point, a polyethylene terephthalate fiber, and the like, but is not limited thereto.

The separator is simply disposed between the positive electrode and the negative electrode as in the common lithium secondary battery, and may serve to separate the positive electrode and the negative electrode. In addition, the separator may be in the state of being bound (adhered) to at least one or more electrodes of the positive electrode and the negative electrode.

The electrolyte may be any common non-aqueous electrolyte which smoothly conducts ions involved in charge and discharge of a battery, in the common lithium secondary battery. As an example, the non-aqueous electrolyte may include a non-aqueous solvent and a lithium salt. As a non-limiting example, the lithium salt contained in the electrolyte may be a salt providing lithium cations and one or more anions selected from the group comprising $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The solvent of the electrolyte may be one or more selected from the group comprising ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methyl carbonate, methylpropyl carbonate, ethylpropylcarbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, methyl-γ-butyrolactone, γ-thiobutyrolactone, γ-ethyl-γ-butyrolactone, β-methyl-γ-butyrolactone, γ-valerolactone, σ-valerolactone, γ-caprolactone, ε-caprolactone, β-propiolactone, tetrahydrofuran, 2-methyl tetrahydrofuran, 3-methyltetrahydrofuran, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, 2-ethylsulfolane, and the like. However, the present invention may not be limited to the lithium salts and the solvents described above, of course.

The lithium secondary battery according to an exemplary embodiment of the present invention may be produced by producing an electrode assembly including a separator interposed between a positive electrode and a negative electrode, charging the produced electrode assembly in a case, and injecting the electrolyte and sealing the case. Otherwise, the lithium secondary battery may be produced by charging the electrode assembly impregnated with an electrolyte in a case and sealing the case. A battery case may be any case which is commonly used in the lithium secondary battery field. As an example, the case may have a cylindrical shape, a square shape, a pouch shape, or a coin shape, but the present invention is not limited to the specific shapes of the battery case, of course.

The present invention includes a battery module, in which the secondary battery described above, as an example, a lithium secondary battery is used as a unit cell and the unit cells are connected in series or in parallel.

The present invention includes a device to which electric power is supplied by the secondary battery described above, as an example, the lithium secondary battery. As a specific example, the device may be an electric automobile, a hybrid electric automobile, a plug-in hybrid electric automobile, a system for power storage, and the like, but is not limited thereto.

FIG. 7 is an optical photograph of the active material film (3 cm×5 cm×280 μm) produced according to an exemplary embodiment of the present invention. The active material film of FIG. 7 is obtained by producing an active material bulk by molding and sintering, and then slicing the active material bulk into the film having a thickness of 280 μm using an electric saw. Specifically, molding was performed by placing a mixture in which artificial graphite:pitch were mixed at a weight ratio of 8:2 in a mold, performing compression to perform primary molding, and then subjecting the primarily molded body to second pressing with cold isostatic pressing (CIP). For sintering, the molded body produced under a nitrogen atmosphere having an oxygen concentration of 50 ppm or less was heated to 700° C. at a rate of 2° C./min, subjected to primary heat treatment at 700° C. for 60 minutes, heated again from 700° C. to 1200° C. at a rate of 3° C./min, and subjected to secondary heat treatment at 1200° C. for 60 minutes, thereby producing an active material bulk. Apparent porosities of the produced active material bulk and the active material film were substantially the same, which were 19.8%.

FIG. 8A is a scanning electron microscope photograph of the surface of the produced active material film, and FIG. 8B is a scanning electron microscope photograph of the thickness cross section of the produced active material film. As seen from FIGS. 8A and 8B, it was found that since the active material film was produced by slicing the active material bulk which already had uniform characteristics, the porosities in the surface and thickness cross section of the active material film are substantially the same, and the active material film has an open pore structure. In addition, as a result of observing the surface resin and the central region in the thickness cross section of the produced active material film and measuring the pore area, it was confirmed that the porosities were substantially the same.

FIG. 9 is an optical photograph of a negative electrode in which the active material film of FIGS. 7 and 8 is adhered to a Cu foil which is the current collector. When producing the negative electrode of FIGS. 8A and 8B, the active material film is polished to be mirrored and the mirrored surface was adhered to the current collector, and as the conductive adhesive, a copper paste (65 wt % of 30 nm copper nanoparticles, 8 wt % of styrene-butadiene rubber) was used.

Table 1 summarizes and shows the characteristics of the secondary battery produced using the negative electrode of FIGS. 8A and 8E. In Table 1, Comparative Examples (1 and 2) are results of the secondary battery provided with a negative electrode produced using the conventional slurry method of applying of the negative electrode slurry, drying, and rolling, under the conditions of graphite as an active material and a weight ratio (%) of organic binder/active material of 3.1, and are examples produced with the thicknesses of the active material layer being different from each other.

When producing the electrode, lithium metal (3.2 cm×5.2 cm×2 mm) was used as a positive electrode, a separator (polyethylene, thickness of 25 μm) was interposed between the negative electrode and the positive electrode plates to configure the battery, and a tab portion of the positive electrode and a tab portion of the negative electrode were welded, respectively.

The welded positive electrode/separator/negative electrode combination were placed in a pouch, the portion with a tab was included in a sealed portion, so that three sides except for an electrolyte solution injection unit surface were sealed. The electrolyte solution was injected to the remaining portion, the remaining portion was sealed, and impregnation was performed for 12 hours or more. As the electrolyte solution, a 1M $LiPF_6$ solution as a mixed solvent of ethylene carbonate (EC)/ethylmethyl carbonate (RMC)/diethylene carbonate (DEC) (volume ratio of 25/45/30) was used.

Thereafter, charge was performed with a current corresponding to 0.05 C (13 mA, 0.9 mA/$cm^2$) for about 20 hours. After the charge was completed, discharge to 1.5 V was performed with 0.1 C, and capacity and charge/discharge efficiency were measured. (Charge condition CC/CV 0.05 C 0.05V 0.01 C CUT-OFF, discharge condition CC 0.1 C 1.5V CUT-OFF)

TABLE 1

| | Example | Comparative Example 1 | Comparative Example 2 |
|---|---|---|---|
| Negative electrode active material density | 1.73 (g/$cm^3$) | 1.70 (g/$cm^3$) | 1.70 (g/$cm^3$) |
| Negative electrode active material loading amount | 49.4 (g/$cm^2$) | 13.1 (g/$cm^2$) | 23 (g/$cm^2$) |
| Negative electrode active material thickness | 280 (μm) | 87 (μm) | 145 (μm) |
| Negative electrode active material porosity | 19.8 (%) | 20.4 (%) | 20.2 (%) |

TABLE 1-continued

|  | Example | Comparative Example 1 | Comparative Example 2 |
|---|---|---|---|
| Capacity at 0.1 C | 363.7 (mAh/g) | 362.5 (mAh/g) | 361.3 (mAh/g) |
| Initial charge/discharge efficiency | 94.4 (%) | 91.4 (%) | 91.5 (%) |
| Capacity at 2 C | 353.5 (mAh/g) | 320.8 (mAh/g) | 225.1 (mAh/g) |
| 2 C/0.1 C capacity retention ratio | 97.28 | 88.5% | 62.3% |

As seen from Table 1, it was found that when the active material layer is produced using the conventional active material slurry, as a loading amount is increased, resistance is increased by an organic binder and the like, so that the capacity is decreased, and in particular at a high ratio, a large capacity decrease occurred. However, it was found that the electrode produced according to an exemplary embodiment of the present invention maintained an open pore structure which was uniform through the film and was free from the resistance of the organic binder, and thus, capacity and efficiency reduction did not occur even at a thick film of 280 μm.

Hereinabove, although the present invention has been described by specific matters, defined exemplary embodiments, and drawings, they have been provided only for assisting in the more entire understanding of the present invention. Therefore, the present invention is not limited to the exemplary embodiments. Various modifications and changes may be made those skilled in the art to which the present invention pertains from this description.

Therefore, the spirit of the present invention should not be limited to the above-described exemplary embodiments, and the following claims, as well as all modified equally or equivalently to the claims, are intended to fall within the scope and spirit of the invention.

The invention claimed is:

1. A method of producing an electrode for a lithium secondary battery, the method comprising:
   a cutting step of slicing an active material bulk to produce an active material film; and
   a binding step of integrating a current collector and the active material film,
   wherein the lithium secondary battery has a structure in which the active material film has open pore channels on a cross section in a thickness direction, and the open pore channels penetrate the active material film, and
   wherein the active material film has an apparent porosity of 10 to 45%,
   wherein an electrode active material in the active material bulk has an orientation that is substantially parallel to the thickness direction of the active material film, and the orientation of the electrode active material in the active material film is controlled by a cutting direction in the cutting step.

2. The method of producing an electrode for a secondary battery of claim 1, further comprising:
   a bulk production step of using a raw material including a particulate electrode active material to produce the active material bulk, before the slicing step.

3. The method of producing an electrode for a secondary battery of claim 2, wherein the bulk production step includes: a molding step of compression-molding the raw material to produce a molded body; or the molding step and a sintering step of heat-treating the molded body produced in the molding step to produce a sintered body.

4. The method of producing an electrode for a secondary battery of claim 3, wherein the raw material further includes one or more additives selected from the group comprising binders, conductive materials, carbon precursors, and pore forming agents.

5. The method of producing an electrode for a secondary battery of claim 1, wherein the binding step includes:
   forming an adhesive layer on at least one surface of a surface of the current collector and a surface of the active material film; and
   layering the current collector and the active material film so as to be in contact with each other, with the adhesive layer interposed therebetween.

6. The method of producing an electrode for a secondary battery of claim 1, wherein the binding step includes:
   forming a metal film on one surface of the active material film.

7. The method of producing an electrode for a secondary battery of claim 2, wherein the active material contains natural graphite, artificial graphite, or a mixture thereof.

8. The method of producing an electrode for a secondary battery of claim 2, wherein the bulk production step includes press-molding the raw material including a particulate electrode active material and a carbon precursor to produce the molded body; and heat-treating the molded body to pyrolyze the carbon precursor into carbon.

9. The method of producing an electrode for a secondary battery of claim 5, wherein the adhesive layer includes a conductive material.

10. The method of producing an electrode for a secondary battery of claim 9, wherein the conductive material of the adhesive layer includes carbon black, Ketjen black, carbon nanofibers, and carbon nanotubes.

11. The method of producing an electrode for a secondary battery of claim 2, wherein the bulk production step includes press-molding at least one or more of the raw materials including an electrode active material core, a material of a carbon precursor shell, or composite particles having a core-shell structure as the particulate electrode active material to produce a molded body; and heat-treating the molded body to pyrolyze a carbon precursor of the shell into carbon.

* * * * *